US008294663B2

(12) United States Patent
Miyazaki

(10) Patent No.: US 8,294,663 B2
(45) Date of Patent: Oct. 23, 2012

(54) METHOD OF DRIVING ELECTROPHORESIS DISPLAY DEVICE, ELECTROPHORESIS DEVICE, AND ELECTRONIC APPARATUS

(75) Inventor: Atsushi Miyazaki, Suwa (JP)

(73) Assignee: Seiko Epson Corporation, Tokyo (JP)

( * ) Notice: Subject to any disclaimer, the term of this patent is extended or adjusted under 35 U.S.C. 154(b) by 922 days.

(21) Appl. No.: 12/188,338

(22) Filed: Aug. 8, 2008

(65) Prior Publication Data

US 2009/0073111 A1 Mar. 19, 2009

(30) Foreign Application Priority Data

Sep. 13, 2007 (JP) ................................ 2007-237637

(51) Int. Cl.
*G09G 3/34* (2006.01)
*G02B 26/00* (2006.01)

(52) U.S. Cl. ......................... 345/107; 345/108; 359/296

(58) Field of Classification Search .................. 345/107; 359/296

See application file for complete search history.

(56) References Cited

U.S. PATENT DOCUMENTS

| | | | | |
|---|---|---|---|---|
| 7,126,743 | B2 * | 10/2006 | Johnson et al. | 359/296 |
| 7,656,384 | B2 | 2/2010 | Saito | |
| 7,859,527 | B2 * | 12/2010 | Hirota et al. | 345/208 |
| 8,089,454 | B2 * | 1/2012 | Saito | 345/107 |
| 2003/0048370 | A1 * | 3/2003 | Koyama | 348/311 |
| 2004/0113903 | A1 * | 6/2004 | Mikami et al. | 345/204 |
| 2005/0152020 | A1 * | 7/2005 | Johnson et al. | 359/296 |
| 2006/0291032 | A1 * | 12/2006 | Zhou et al. | 359/296 |
| 2007/0030243 | A1 * | 2/2007 | Ishii | 345/107 |
| 2007/0035510 | A1 * | 2/2007 | Zhou et al. | 345/107 |
| 2007/0070028 | A1 * | 3/2007 | Zhou et al. | 345/107 |

(Continued)

FOREIGN PATENT DOCUMENTS

| | | | |
|---|---|---|---|
| EP | 1429310 | A | 6/2004 |
| EP | 1750242 | A | 2/2007 |
| EP | 1775695 | A | 4/2007 |
| JP | 03-213827 | | 9/1991 |
| JP | 2002-116733 | | 4/2002 |
| JP | 2006-267982 | | 10/2006 |
| JP | 2007-079301 | A | 3/2007 |

(Continued)

OTHER PUBLICATIONS

European Search Report, Oct. 23, 2009, issued in related Patent Application No. EP-08253004.

*Primary Examiner* — Amare Mengistu
*Assistant Examiner* — Sarvesh J Nadkarni
(74) *Attorney, Agent, or Firm* — AdvantEdge Law Group, LLC

(57) ABSTRACT

A method of driving an electrophoresis display device having a displaying portion which includes an lectrophoresis element containing electrophoresis particles and disposed between a first electrode and a second electrode opposing to one another and which consists of a plurality of pixels, the driving method including a step of performing an image writing step in which an image is written into the displaying portion by applying a first potential or a second potential to the first electrode separately provided for the pixel and applying a reference pulse in which the first potential and the second potential repeatedly alternate at a predetermined interval to the second electrode which is a common electrode shared by all the pixels, and a step of performing at least one contrast maintaining step including a short term interval step in which the second electrode and all the first electrodes fall in a high impedance state for five or less seconds and an auxiliary pulse inputting step in which at least one cycle of the reference pulse is applied to the second electrode and a potential which is equivalent to the potential applied during the image writing step is applied to the first electrode while the reference pulse is applied.

14 Claims, 16 Drawing Sheets

U.S. PATENT DOCUMENTS

| | | | | |
|---|---|---|---|---|
| 2007/0075963 | A1* | 4/2007 | Zhou et al. | 345/107 |
| 2007/0080926 | A1* | 4/2007 | Zhou et al. | 345/107 |
| 2007/0080928 | A1* | 4/2007 | Ishii et al. | 345/107 |
| 2009/0237392 | A1* | 9/2009 | Kajino | 345/214 |
| 2009/0251456 | A1* | 10/2009 | Koyama | 345/214 |
| 2010/0091003 | A1 | 4/2010 | Saito | |

FOREIGN PATENT DOCUMENTS

| | | | |
|---|---|---|---|
| JP | 2007-193201 | A | 8/2007 |
| JP | 2007-316594 | | 12/2007 |
| WO | WO-03075086 | A | 9/2003 |
| WO | WO-2005-96260 | A | 10/2005 |

* cited by examiner

METHOD OF DRIVING ELECTROPHORESIS DISPLAY DEVICE, ELECTROPHORESIS DEVICE, AND ELECTRONIC APPARATUS

BACKGROUND

1. Technical Field

The present invention relates to a driving method of an electrophoresis display device, an electrophoresis display device, and an electronic apparatus.

2. Related Art

An electrophoresis display device displays an image by migrating electrophoresis particles by creating a potential difference between a pixel electrode and a common electrode which are disposed to face one another and have an electrophoresis element between them. JP-A-2002-116733 discloses an electrophoresis device having a memory function by which an image is maintained even while the potential difference is not caused between the pixel electrode and the common electrode.

However, if a predetermined time passes after the image is displayed on the electrophoresis display device, the electrophoresis particles gathered at the electrodes scatter. As a result, reflectance of the image displayed with white is decreased and reflectance of the image displayed with black is increased. Therefore, there is a problem in that contrast is lowered. In order to improve the lowered contrast, JP-A-3-213827 discloses a driving method in which a refresh operation is repeatedly performed at every 10 seconds to 10 minutes after the image writing operation is performed.

The refresh operation is to improve the contrast which is lowered after 10 or more minutes after the image displaying is performed. However, the inventors of this invention have found a phenomenon called kick back in which contrast is lowered just several seconds after the image writing is performed besides the above-mentioned contrast lowering.

FIG. 20 is a timing chart showing an image writing operation in a known electrophoresis display device. In FIG. 20, potentials applied to a segment electrode 1035W of a segment performing a white display, a segment electrode 1035B of a segment performing a black display, and a common electrode 1037 are shown. FIG. 20 also shows an image writing period for displaying an image and an image maintaining period for maintaining the displayed image. The structure of an electrophoresis display device driven by a segment driving method is shown in FIGS. 1, 2, and 4. The segment electrodes 1035W and 1035B in FIG. 20 correspond to two segment electrodes 35 of adjacent segments 40 shown in FIG. 2 and the common electrode 1037 corresponds to a common electrode 37.

FIG. 21 shows measurement result of changes in reflectance of the known electrophoresis display device. In FIG. 21, a reference numeral 1001 denotes reflectance of a white display and a reference numeral 1002 denotes reflectance of a black display.

During the image writing period, a high potential is applied to the segment electrode 1035B and a low potential is applied to the segment electrode 1035W. The common electrode 1037 is applied with a pulse in which high potentials and low potentials alternate. In FIG. 21, the image writing period begins from 0.5 seconds and continues for 0.5 seconds. Thus, the reflectance of a white display is increased and the reflectance of a black display is decreased.

When the image writing period terminates, the image maintaining period begins. During the image maintaining period, the segment electrode 1035B, 1035W, and the common electrode 1037 are in a high impedance state.

However, right after the image writing period terminates, the reflectance of a white display is remarkably decreased and the reflectance of a black display is moderately increased. That is, it can be known that the contrast lowering occurs right after the image maintaining period begins. This problematic phenomenon is the kick back phenomenon discovered by the inventors.

The inventors clarifies that the lowering range of the contrast attributable to the kick back depends on moisture content of the electrophoresis display element by experiments.

SUMMARY

An advantage of some aspects of the invention is that it provides a driving method of an electrophoresis display device, an electrophoresis display device, and an electronic apparatus which are capable of maintaining a high contrast image after image writing.

The driving method of an electrophoresis display device, the electrophoresis display device, and the electronic apparatus according to the invention have the following characteristics.

According to one aspect of the invention, there is provided a method of driving an electrophoresis display device having a displaying portion which includes an electrophoresis element containing electrophoresis particles and disposed between a first electrode and the second electrode opposing to one another and which consists of a plurality of pixels, the driving method includes a step of performing an image writing step in which an image is written into the displaying portion by applying a first potential or a second potential to the first electrodes separately provided for the pixels and applying a reference pulse in which the first potential and the second potential repeatedly alternate at a predetermined interval to the second electrode which is a common electrode shared by all the pixels, and a step of performing at least one contrast maintaining step including a short term interval step in which the second electrode and all the first electrodes fall in a high impedance state for five or less seconds and an auxiliary pulse inputting step in which at least one cycle of the reference pulse is applied to the second electrode and a potential which is equivalent to the potential applied during the image writing step is applied to the plurality of first electrodes while the reference pulse is applied.

With this operation, it is possible to suppress the reflectance lowering which occurs right after the image writing. Accordingly, it is possible to decrease the contrast lowering and thus to realize a driving method of an electrophoresis display device capable of performing a high contrast display.

It is preferable that the contrast maintaining step be repeated several times.

With this operation, it is possible to effectively suppress the reflectance lowering of the tone right after the image writing operation, and thus it is possible to realize a driving method of an electrophoresis display device capable of performing a high contrast display.

It is preferable that a period of the short term interval steps is changed every when the contrast maintaining step is performed.

With this operation, it is possible to properly set an auxiliary pulse needed to eliminate the kick back according to changes of the contrast of the pixel and thus to effectively prevent the contrast lowering and to realize a driving method of an electrophoresis display device capable of performing a high contrast display.

It is preferable that the contrast maintaining step continue until a next image writing step begins.

With this operation, it is possible to continuously suppress the reflectance decrease right before the next image writing begins. Accordingly, it is possible to realize a driving method by which a high contrast display can be always maintained.

In the short term interval step, the first electrode is applied with a potential which is equivalent to the potential applied during the image writing step, and the second electrode is in a high impedance state.

With this operation, since the potential which is inputted to the first electrode in the short term interval step is reset, there is no need to input again a potential to the first electrode in the auxiliary pulse inputting step. Accordingly, it is possible to realize a driving method of an electrophoresis display device which is capable of suppressing load of the control portion.

After the contrast maintaining step, it is preferable that a long term interval step, in which the first electrodes and the second electrode stay in a high impedance state for 5 to 60 minutes, and a refresh step, in which a pulse, which creates a potential difference between the first electrode and the second electrode, the potential difference being equivalent to that caused in the image writing step, is inputted to the first electrode, are performed.

With this operation, since it is possible to suppress the reflectance decrease right after the contrast maintaining step, it is possible to realize a driving method of an electrophoresis display device, which is capable of performing a high contrast display for a relatively long period.

It is preferable that the short term interval step continue for 200 or more milliseconds.

With this operation, it is possible to avoid overwriting to the pixels, attributable to reapplication of a voltage to the first electrode and the second electrode right after the image writing operation. Accordingly, it is possible to prevent the contrast decrease attributable to the overwriting and thus to provide a driving method of an electrophoresis display device, which is capable of realizing a high contrast display.

It is preferable that the width of the pulse used in the auxiliary pulse inputting step is set to be in a range from 1 to 20 milliseconds.

That is, the pulse width in the auxiliary pulse inputting step is preferably smaller than the pulse width in the image writing step. The change of the reflectance in the auxiliary pulse inputting step is relatively small in comparison with the change of reflectance in the image writing step. Since the input power is adjusted to comply with the decreased reflectance change, it is possible to avoid overwriting to the pixels and prevent contrast lowering attributable to the overwriting.

It is preferable that a period of the auxiliary pulse inputting step is shortened every when the contrast maintaining step is performed.

By shortening the period of the short term interval step every when the contrast maintaining step is performed, it is possible to set a period of the short term interval step to comply with the amount of reflectance change which occurs every when the contrast maintaining step is repeated. With this operation, it is possible to effectively obtain a high contrast display at small power.

According to another aspect of the invention, there is provided 7 an electrophoresis device having a displaying portion which includes an electrophoresis element containing electrophoresis particles and disposed between a first electrode and a second electrode opposing to one another and which consists of a plurality of pixels, wherein a control portion performs at least one contrast maintaining operation including a short term interval operation in which the second electrode and all the first electrodes fall in a high impedance state for five or less seconds, and an auxiliary pulse inputting operation in which at least one cycle of a reference pulse is applied to the second electrode and a potential which is equivalent to the potential applied during the image writing step is applied to the plurality of first electrodes while the reference pulse is applied, after performing an image writing operation in which an image is written into the displaying portion by applying a first potential or a second potential to the first electrodes separately provided for the pixels and applying the reference pulse in which the first potential and the second potential repeatedly alternate at a predetermined interval to the second electrode which is a common electrode shared by all the pixels.

With this structure, it is possible to suppress reflectance decrease occurring right after image writing thanks to the auxiliary pulse input performed after the image writing. Accordingly, it is possible to prevent the contrast from being lowered and to provide an electrophoresis display device capable of realizing a high contrast display.

It is preferable that the control portion repeats the contrast maintaining operation a plurality of times.

With this structure, it is possible to effectively suppress reflectance decrease occurring right after the image writing.

Accordingly, it is possible to provide an electrophoresis display device capable of realizing a high contrast display.

It is preferable that periods of the short term interval operations are different for every contrast maintaining operation.

With this structure, since it is possible to properly set the auxiliary pulse needed to eliminate the kick back to comply with the change of the contrast of the pixels, it is possible to effectively prevent the contrast from being lowered and to provide an electrophoresis display device capable of realizing a high contrast display.

It is preferable that the control portion continue the control maintaining operation until a next image writing operation begins.

With this structure, since it is possible to continuously suppress the reflectance decrease till the next image writing operation, it is possible to prevent the contrast from continuously being lowered and to provide an electrophoresis display device capable of realizing a high contrast display.

It is preferable that the short term interval operation is an operation for inputting a potential which is equivalent to the potential applied during the image writing operation to the first electrode and making the second electrode fall in a high impedance state.

With this structure, since the potential inputted to the first electrode in the short term interval step is not reset, it is possible to provide an electrophoresis display device which is capable of suppressing load of the control portion, accompanied by the potential reapplication to the first electrode in the auxiliary pulse inputting step.

It is preferable that the control portion performs a refresh operation including a long term interval operation for maintaining the first electrode and the second electrode to be in a high impedance state for 5 to 60 minutes and a refresh pulse inputting operation for inputting a pulse which causes a potential which is equivalent to the potential difference created during the image writing operation between the first electrode and the second electrode to the first electrode.

With this structure, it is possible to suppress the reflectance decrease over a longer period than a period of the contrast maintaining step and thus it is possible to provide an electrophoresis display device which can prevent the contrast from being lowered for a relatively long time and realize a high contrast display.

With such a structure, it is possible to suppress reflectance decrease after the contrast maintaining operation, and thus is possible to provide an electrophoresis display device performing a high contrast display for a relatively long period.

It is preferable that the pixels and the control portion are connected to one another via pixel circuits provided for every pixels, respectively, and each of the pixel circuits includes a memory portion.

With this structure, it is possible to store the potential applied to the first electrode during the image writing operation in the memory portion, and thus is possible to provide an electrophoresis display device which can suppress load of the control portion needed to reapply the potential to the first electrode during the auxiliary pulse inputting operation and the refresh pulse inputting operation.

It is preferable that the control portion perform the short term interval operation for 200 or more milliseconds.

With this structure, it is possible to avoid overwriting to the pixel attributable to voltage reapplication to the first and second electrodes right after the image writing operation. Accordingly, it is possible to provide an electrophoresis display device capable of preventing contrast lowering attributable to the overwriting and realizing a high contrast display.

It is preferable that the control portion set a pulse width of the pulse to be in a range from 1 to 20 milliseconds in the auxiliary pulse inputting operation.

That is, it is preferable that a pulse width of a pulse used in the auxiliary pulse inputting operation be smaller than that of a pulse used in the image writing operation. The change of the reflectance in the auxiliary pulse inputting operation is smaller than that in the image writing operation. Accordingly, it is possible to avoid the overwriting to the pixels by decreasing the input power to comply with the reflectance change, and thus is possible to prevent the contrast lowering attributable to the overwriting.

It is preferable that the control portion shorten a period of the auxiliary pulse inputting operation every when repeating the contrast maintaining operation.

By shortening the period of the short term interval operation every when the contrast maintaining operation is repeated, it is possible to set the period of the short term interval operation to comply with the amount of the change of the reflectance, which occurs every when the contrast maintaining operation is repeated.

According to further aspect of the invention, there is provided an electronic apparatus including the electrophoresis display device.

With such a structure, it is possible to suppress reflectance decrease right after image writing, and thus is possible to provide an electronic apparatus capable of preventing contrast lowering and obtaining a high contrast display.

BRIEF DESCRIPTION OF THE DRAWINGS

The invention will be described with reference to the accompanying drawings, wherein like numbers reference like elements.

DESCRIPTION OF EXEMPLARY EMBODIMENTS

First Embodiment

Structure of Electrophoresis Display Device

Hereinafter, an electrophoresis display device according to embodiments of the invention will be described with reference to the accompanying drawings. This embodiment is described with a segment-driving-type electrophoresis display device as an example of the electrophoresis display device.

The embodiment shows only one aspect of the invention but do not limit the invention and can be modified in the scope of the technical spirit of the invention. In drawings, every part is not depicted with real scales in order to show the parts in easily visible manner.

Figure 1:
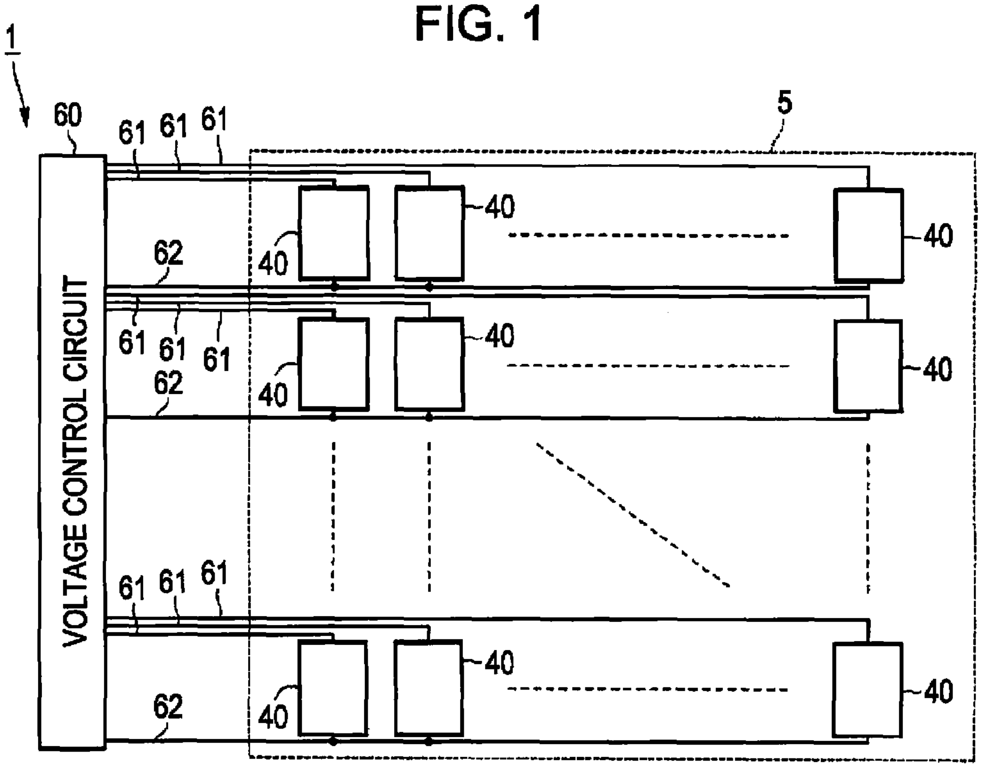
FIG. 1 is a schematic plan view illustrating an electrophoresis display device 1.

FIG. 1 shows the segment-driving-type electrophoresis display device 1. The electrophoresis display device 1 includes a displaying portion 5 in which a plurality of segments (pixels) 40 is arranged, and a voltage control circuit (control portion) 60. The voltage control circuit 60 and each of the segments 40 are electrically connected with one another via a segment electrode drive wiring 61 and a common electrode drive wiring 62.

The segment driving type is a driving method in which a potential based on image data is directly inputted into each of the segments 40 from the voltage control circuit 60.

Figure 2:
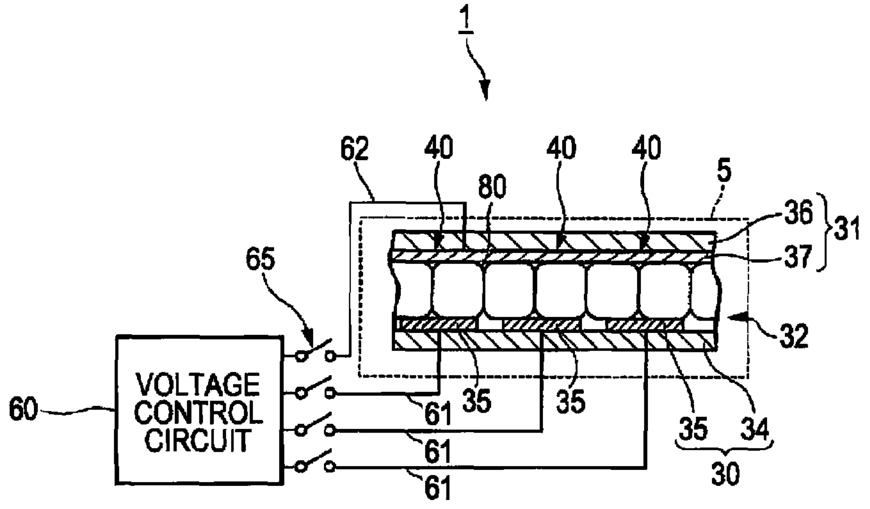
FIG. 2 is a view illustrating the sectional structure and electric configuration of the electrophoresis display device 1.

FIG. 2 shows the sectional structure and electrical connection of the electrophoresis display device 1. The displaying portion 5 includes a substrate 30 consisting of a first substrate 34 and a plurality of segment electrodes (first electrodes) 35 disposed on a first substrate 34, an opposing substrate 31 consisting of a second substrate 36 and a common electrode (second electrode) 37 disposed on the second substrate 36, and electrophoresis elements 32, each consisting of a plurality of microcapsules 80, each containing electrophoresis particles (not shown) 32 therein. The electrophoresis elements 32 are maintained between the segment electrode 35 and the common electrode 37 which face one another.

The segment electrode 35 is formed corresponding to segments 40, respectively and the common electrode 37 is a common electrode shared by all the segments 40. The electrophoresis display device 1 is configured to display an image at the common electrode 37 side.

Each segment 35 is electrically connected to the voltage control circuit 60 via the segment electrode drive wiring 61 and a switch 65. The common electrode 37 is electrically connected to the voltage control circuit 60 via the common electrode drive wiring 62 and a switch 65.

Figure 3:
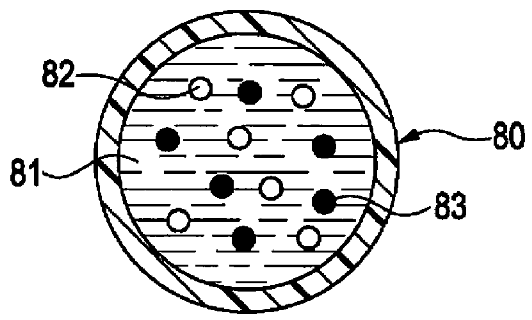
FIG. 3 is a view illustrating a microcapsule 80.

FIG. 3 shows a microcapsule 80. The microcapsule 80 has a grain diameter of about 50 micrometers. A material for the microcapsule 80 may be transparent polymer resin, such as acryl resin including polymethylmethacrylate and polyethylmethacrylate, urea resin, gelatine.

Inside the microcapsule 80 sealed a dispersion medium 81, a plurality of white particles (electrophoresis particles) 82, and a plurality of black particles (electrophoresis particles) 83.

The dispersion medium 81 is a liquid which disperses the white particles 82 and the black particles 83 in the microcapsule 80. As the dispersion medium 81, water; an alcohol-based solvent, such as water, methanol, ethanol, isopropanol, butanol, octanol, and methyl cellosolve; a variety of esters, such as acetic ethyl and acetic butyl; ketone, such as acetone, methylethylketone, and methylisobutylketone; aliphatic hydrocarbon, such as pentane, hexane, and octane; cycloaliphatic hydrocarbon, such as cyclohexane and methylcyclohexane; aromatic hydrocarbon, such as benzene having a long-chain alkyl group, such as benzene, toluene, xylene, hexylbenzene, heptane, hebuthylbenzene, octylbenzene, nonylbenzene, decylbenzene, undecylbenzenesulfonate, dodecylbenzene, tridecylebenzene, and tetradecylbenzene; halogenated hydrocarbon, such as methylene chloride, chloroform, carbon tetrachloride, and 1,2-dichloroethane; carboxylate; and other kinds of oils can be used in the form of a single material or a mixture. Further, surfactant may be added to the above-mentioned solvent.

The white particles 82 are particles (polymer particles or inorganic particles) made of white pigment, such as titanium dioxide, zinc oxide, and antimony trioxide, and are charged in negative.

The black particles 83 are particles (polymer particles or inorganic particles) made of black pigment, such as aniline black and carbon black, and are charged in positive.

If it is necessary, a charge control agent containing an electrolyte, a surfactant, metal soap, a resin, gum, oil, varnish, and compound particles; a dispersant such as a titanium-coupling agent, an aluminum-coupling agent, and a silane-coupling agent; a lubricant; a stabilizing agent; and the like can be added to the pigment.

Figure 4A:
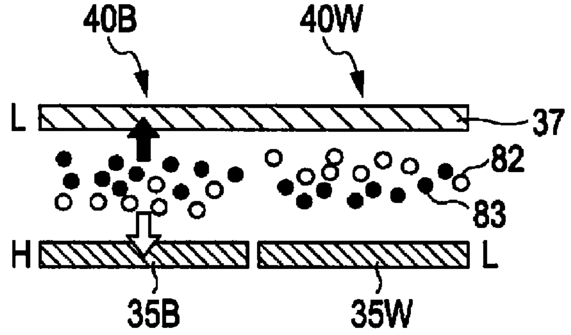
FIGS. 4A, 4B, and 4C are explanatory views illustrating operation of white particles 82 and the black particles 83.
Figure 4B:
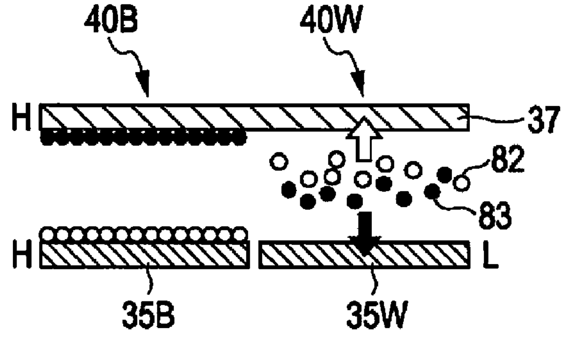
Figure 4C:
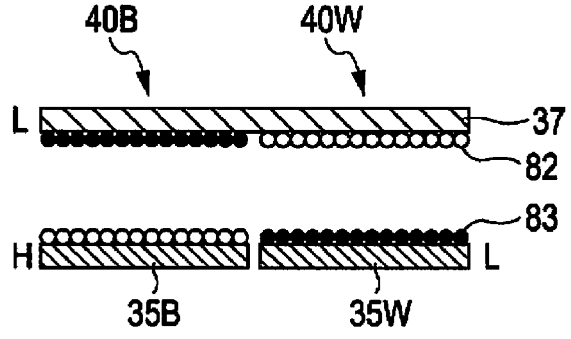

FIGS. 4A, 4B, and 4C show the operation of the white particles 82 and the black particles 83. In FIGS. 4A, 4B, and 4C, segments 40B performing a black display and segments 40W performing a white display are depicted in order to compare movements of the white particles 82 and the black particles 83.

In FIGS. 4A and 4B, a pixel electrode 35B of the segment 40B and a pixel electrode 35W of the segment 40W, which serve as the first electrodes, are applied with a potential corresponding to the image data. In greater detail, the pixel electrode 35W for performing a white display is applied with a low potential L which is a first potential. The pixel electrode 35B for performing a black display is applied with a high potential H which is a second potential.

On the other hand, the common electrode 37 is applied with a reference pulse in which the low potential L serving as the first potential and the high potential H serving as the second potential alternates.

In this application, such a driving method is called common swing driving. The common swing driving means a driving method in which a pulse in which a high potential H and a low potential L are alternately repeated with at least one cycle is applied to the common electrode 37 during an image writing period.

According to this common swing driving method, since the pixel electrode and the common electrode can be controlled by two values, the high potential H and the low potential L, it is possible to accomplish voltage lowering and simplify the circuit structure. In the case in which a thin film transistor (TFT) is used as a switching element for each of the pixel electrodes 35 (35B and 35W), it is advantageous in that it is possible to ensure reliability of the TFT with low voltage driving.

FIG. 4A shows the operation in which the low potential L in the first cycle is applied to the common electrode 37 in the common swing driving.

In the pixel 40B, the low potential L is applied to the common electrode 37 and the high potential H is applied to the segment electrode 35B. Accordingly, the black particles 83, which are charged positively, gather around the common electrode 37 and the white particles 82, which are negatively charged, gather around the segment electrode 35B.

On the other hand, in the pixel 40W, both of the common electrode 37 and the segment electrode 35W are applied with the same low potential L. Accordingly, there is no potential difference between the common electrode 37 and the segment electrode 35W, and thus the particles do not move.

FIG. 4B shows the operation in which the high potential H is applied to the common electrode 37 in the first cycle of pulse.

In the pixel 40W, the common electrode 37 is applied with the high potential H and the segment electrode 35W is applied with the low potential L. Accordingly, the positively charged black particles 83 move toward the segment electrode 35W and the negatively charged white particles 82 move toward the common electrode 37.

On the other hand, in the pixel 40B, both of the common electrode 37 and the segment electrode 35B are applied with the high potential H. Accordingly, there is no potential difference between the common electrode 37 and the segment electrode 35B, and thus the particles do not move and this state is maintained.

FIG. 4C shows the operation after the first cycle of pulse is applied by the common swing driving method.

In the pixel 40B, the white particles 82 gather around the segment electrode 35B and the black particles 83 gather around the common electrode 37. Accordingly, a black display is shown from the common electrode 37 side, which serves as a displaying surface.

In the pixel 40W, the black particles 83 gather around the segment electrode 35W and the white particles 82 gather around the common electrode 37 side. Accordingly, a white display is shown from the common electrode 37 side which serves as a displaying surface.

It is possible to display red, green, and blue colors on the displaying portion 5 by replacing pigments used for the white particles 82 and the black particles 83 are replaced with pigments for red, green, and blue colors.

The driving method of the electrophoresis display device of the invention will be described with reference drawings.

Figure 5:
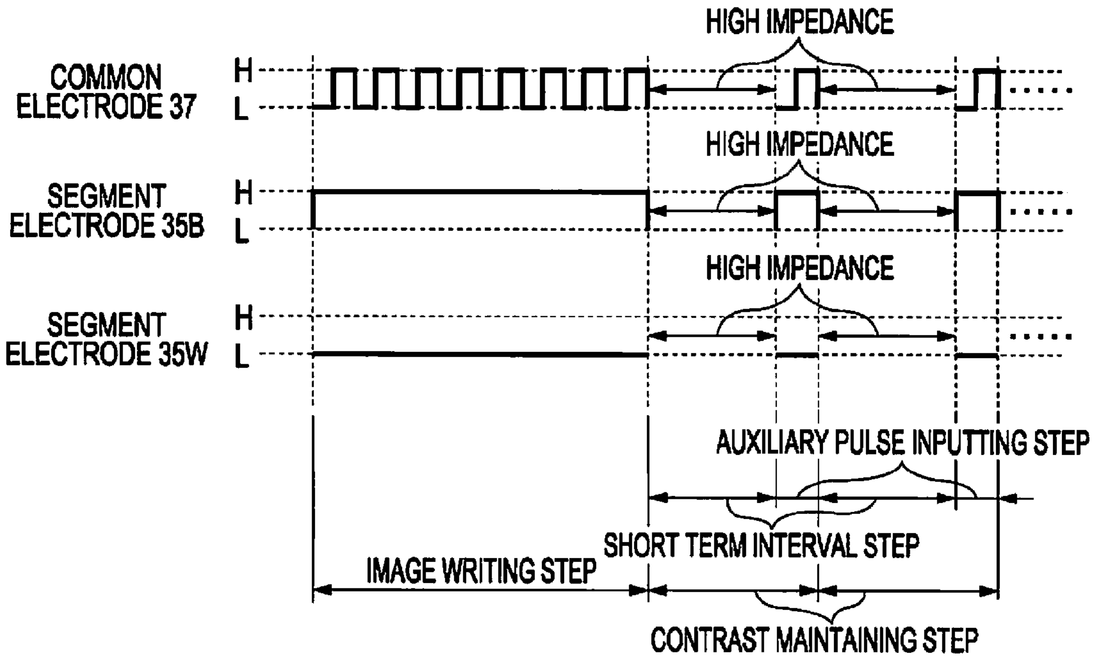
FIG. 5 is a timing chart according to a first driving method.

FIG. 5 shows a timing chart according to a first driving method.

The electrophoresis display device according to the invention uses a driving method by which high contrast can be realized by increasing reflectance of a white display and decreasing reflectance of a black display after the image writing operation. The driving method according to a first embodiment performs a contrast maintaining step a plurality of times after the image writing step.

Figure 20:
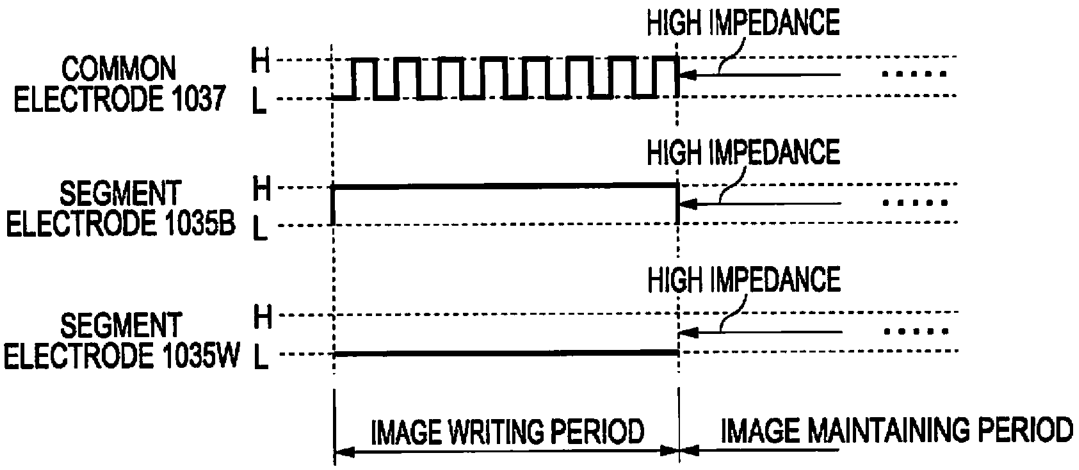
FIG. 20 is a timing chart according to a known electrophoresis display device.
Figure 21:
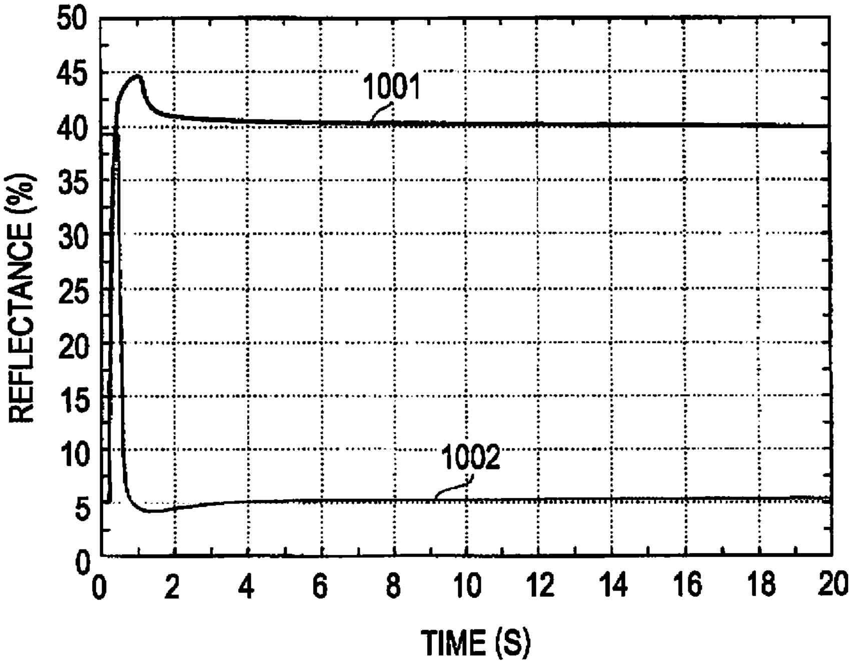
FIG. 21 is a view illustrating reflectance change in the known electrophoresis display device.

The image writing step is the same as an image writing period of FIG. 20. That is, the image writing step is another expression of the image writing period.

As shown in FIG. 5, the driving method of the embodiment includes an image writing step and a contrast maintaining step. The timing chart shown in FIG. 5 is for the segments 40B (black display) and the segments 40W (white display) shown in FIGS. 4A, 4B, and 4C. FIG. 5 shows potentials applied to the common electrode 37, the segment electrode 35B of the segment 40B, and the segment electrode 35W of the segment 40W.

In the image writing step, a voltage is supplied for each of the segments 40 on the basis of the display image and a desired image is displayed on the displaying portion 30.

In the image writing step, the common electrode 37 is applied with the reference pulse in which the low potential L and the high potential H periodically alternates. With this embodiment, the reference pulse supplied to the common electrode 37 is a pulse with a cycle of 40 milliseconds consisting of a period for the low potential L (0V) is 20 milliseconds and a period for the high potential H (15V) is 20 milliseconds. Further, the segment electrode 35B of the segment 40B performing a black display is applied with the high potential H and the segment electrode 35W of the segment 40W performing a white display is applied with the low potential L.

When using the pulse having the above-described pulse width and cycle, it is possible to perform image writing, suppressing load applied to the white particles 82 and the black particles 83. Accordingly, it is possible to suppress reflectance recovery by preventing the image overwriting.

During a period in which the low potential L is applied to the common electrode 37, a potential difference is caused between the common electrode 37 and the segment electrode 35B. Accordingly, the black particles 83 move to the common electrode 37 and the white particles 82 move to the segment electrode 35B.

On the other hand, during a period in which the high potential H is applied to the common electrode 37, a potential difference is caused between the common electrode 37 and the segment electrode 35W. Accordingly, white particles 82 move to the common electrode 37 and the black particles 83 move to the segment electrode 35W.

By the common swing driving which repeats these operations, the segment 40B performs a black display and the segment 40W performs a white display.

When the image writing step is finished, a contrast maintaining step begins. In the contrast maintaining step, a short term interval step and an auxiliary pulse inputting step is performed.

First, the short term interval step will be described. In the short term interval step, the segment electrodes 35B and 35W and the common electrode 37 are electrically disconnected from one another and stay in a high impedance state.

A period of the short interval step is in a range from 200 milliseconds to 5 seconds. When the period for the short term interval step is shorter than 200 milliseconds, the auxiliary pulse inputting step is performed in the state in which the reflectance does not nearly change after the image writing. Accordingly, it is impossible to obtain advantageous effects. As a result, overwriting occurs and thus the contrast is likely to be lowered again.

On the other hand, when the period for the short term interval step exceeds 5 seconds, the decreased amount of the reflectance of the white display is increased, and the increased amount of the reflectance of the black display is increased, resulting in a huge drop in the contrast. If the auxiliary pulse inputting step is performed in this state, the change of the reflectance in the auxiliary pulse inputting step is visibly recognized by a user, and a display flashes. That is, a user is visibly stressed.

Hereinafter, the auxiliary pulse inputting step will be described. In the auxiliary pulse inputting step, a single cycle of an auxiliary pulse having a period of the low potential L and a period of the high potential period H is inputted to the common electrode 37. This auxiliary pulse is a pulse having a low potential of 0V, a high potential of 15V, and a pulse width of 20 milliseconds (a cycle of 40 milliseconds) like the reference pulse in the image writing step. The segment electrode 35B is applied with the high potential H (15V) and the segment electrode 35W is applied with the low potential L (0V).

With this operation, during a period in which the low potential L is applied to the common electrode 37, a potential difference is caused between the common electrode 37 and the segment electrode 35B in the segment 40B. Accordingly, some of the black particles 83 which move scattering from the common electrode 37 thanks to the kick back move back closer to the common electrode 37. Further, the white particles 82 move scattering from the segment electrode 35B move back closer to the segment electrode 35B. Accordingly, the reflectance of the black color is recovered to the original level in the segment 35B.

On the other hand, in a period in which the common electrode 37 is applied with the high potential H, a potential difference is caused between the common electrode 37 and the segment electrode 35W in the segment 40W. Accordingly, the white particles 82 moved away from the common electrode 37 come to move back closer toward the common electrode 37, and the black particles 83 move scattering from the segment electrode 35W move closer to the segment electrode 35B. As a result, reflectance of the white color increases again in the segment 35W.

In the driving method, the contrast maintaining step consisting of the short term interval step and the auxiliary pulse inputting step is repeatedly performed a plurality of times. Accordingly, the driving method can compensate the contrast lowering occurring after the first time of contrast maintaining step. That is, since the contrast lowering attributable to the kick back continues for a predetermined period after the image writing step, and the reflectance continuously changes during the period, the reflectance continues to change even after the contrast maintaining step. Accordingly, during a period in which the state of the electrophoresis element 32 is stabilized and the reflectance change is recovered, the contrast maintaining step is repeatedly performed. Therefore, a desired contrast level can be maintained.

Figure 6A:
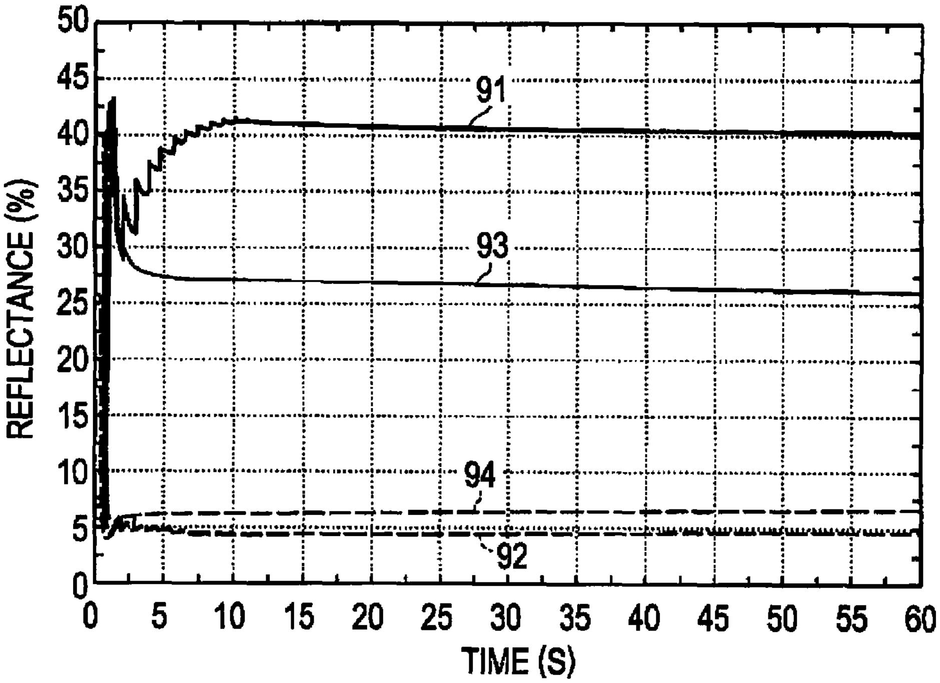
FIGS. 6A and 6B are views illustrating reflectance change.
Figure 6B:
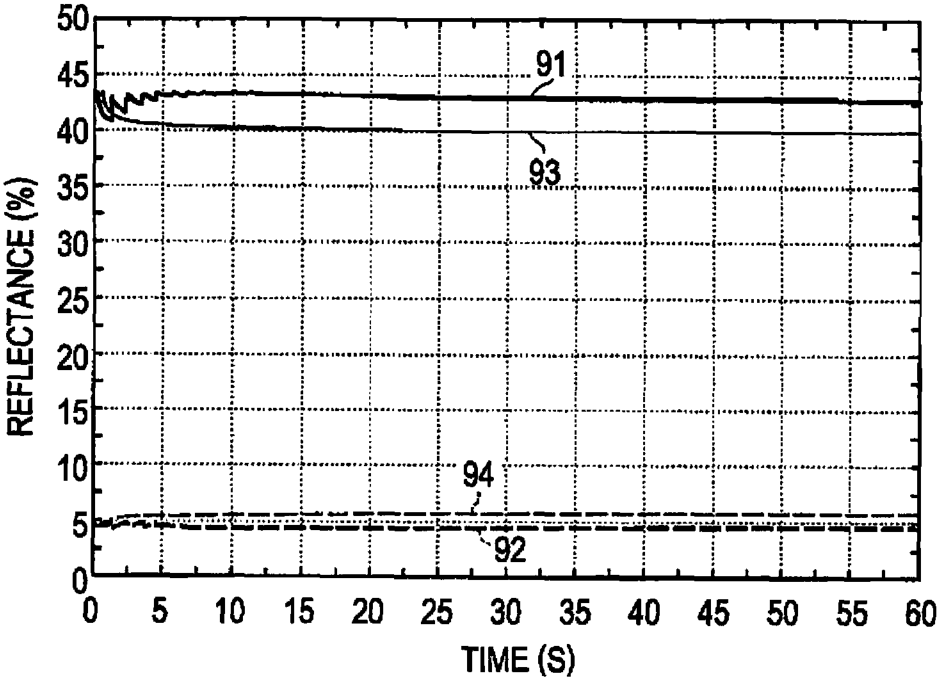

In FIGS. 6A and 6B, reflectance changes in the driving method according to the invention and the known method are compared. FIG. 6A shows the result of change in reflectance with time under dry condition and FIG. 6B shows the result of change in reflectance with time under normal condition.

The dry condition means the state in which the electrophoresis element contains 0% Rh of humidity. The graph shown in FIG. 6A is data obtained using an electrophoresis element stored for a week under condition of 60° C. and 0% Rh. Normal condition means the state of temperature of 25±2.5° C. and relative humidity of 65±20% Rh. The graph shown in FIG. 6B is data obtained using an electrophoresis element stored for a week under the normal condition. The data of the graphs 6A and 6B is measured under the condition of temperature 25° C. and relative humidity 65% Rh.

In the measurement showing the result of FIGS. 6A and 6B, device elements which are not related with the driving method are the same in the device of the invention and the known device. In the driving method of the invention, the contrast maintaining step is repeatedly performed 10 times after the image writing step. In greater detail, in each time of the contrast maintaining step, the short term interval step is 800 milliseconds and the auxiliary pulse inputting step is 40 milliseconds (pulse width of 20 milliseconds in a single cycle). Further, the known driving method provided for the purpose of comparison is the same as the driving method of the invention except that the contrast maintaining step is not performed.

In FIGS. 6A and 6B, reference numeral 91 denotes reflectance of a white display according to the driving method of the invention, and reference numeral 92 denotes reflectance of a black display according to the driving method of the invention. Further, reference numeral 93 denotes reflectance of a white display according to the known driving method and reference numeral 94 denotes reflectance according to the known driving method.

As shown in FIGS. 6A and 6B, according to the known driving method, reflectance of a white display is decreased after the image writing and the reflectance of a black display is increased after the image writing. In particular, under the dry condition of FIG. 6A, the reflectance decrease of a white display is remarkable, and the reflectance is decreased by 20% or more for 5 seconds after the image writing thanks to the kick back phenomenon. Under the normal condition, the reflectance of a white display is decreased by 5% or more by the kick back phenomenon.

With this operation, it is found that almost of the reflectance at the time of image writing can be maintained by employing the driving method of the invention. In particular, under the dry condition, the reflectance is decreased right after the image writing operation, but is recovered to the same degree measured at the time of image writing by repeatedly performing the contrast maintaining step.

For comparison, the contrast after 50 minutes passes in FIG. 6A is about 4.0 and 8.7 when employing the known driving method and the present invention driving method, respectively. That is, it is clarified that the contrast remarkably improves. The values are ratios of the reflectance of a white display to the reflectance of a black display.

According to the driving method of the present invention, under the normal condition, it is possible to maintain almost the same reflectance measured at the time of image writing.

Moreover, according to the invention, it is possible to suppress the increase of the reflectance of a black display and thus to remarkably increase the contrast in comparison with the known driving method.

The reason of the kick back phenomenon of FIGS. 6A and 6B is not apparently found by the inventors. However, since the kick back is troublesome under both of the normal condition and the dry condition, the inventors creatively continue to research, and then get to the present invention.

According to the driving method of the first embodiment of the invention, the following advantage can be obtained.

First of all, since the auxiliary pulse inputting step is performed, the reflectance decrease of a white display after the image writing is suppressed, and the reflectance increase of a black display after the image writing is suppressed. Accordingly, it is possible to contrast from deteriorating after the image writing and realize a high contrast display.

Moreover, it is possible to completely compensate the contrast decrease attributable to the kick back by performing the contrast maintaining step a plurality of times to comply with the period in which the reflectance varies due to the kick back after the image writing, and to obtain desired reflectance for both the white display and black display. Further, since the contrast is increased at the transition time between the contrast maintaining step and an image maintaining period in comparison with the known driving method, deterioration of the display quality occurring after a maintaining period terminates is decreased and it is possible to obtain a comprehensively high quality display.

With this embodiment, although the contrast maintaining step is repeated 10 times, but the number of repetition time is not limited thereto. That is, the repetition time is set to be in a range from 1 to several tens.

Further, with this embodiment, a single cycle of the reference pulse used in the image writing step is supplied to the common electrode 37 as the auxiliary pulse, but the cycle of the pulse applied to the common electrode 37 may not be limited thereto. The pulse may be a half cycle or more than one cycle. When the auxiliary pulse is less than one cycle, the auxiliary pulse can be applied during only a period of the high potential H or a period of the low potential L. When the auxiliary pulse is inputted during only a period of the high potential H, it is possible to suppress the decrease of the reflectance of a white display. Conversely, when the auxiliary pulse is inputted during only a period of the low potential L, it is possible to suppress the decreased of the reflectance of a black display. By each of the case, it is possible to obtain the advantage of improving the contrast. On the other hand, with the increment of the repetition of the auxiliary pulse, the effect of compensating the reflectance change becomes larger and thus the number of repetition may be set according to the characteristic of the electrophoresis element 32.

With this embodiment, the pulse width of the auxiliary pulse is set to 20 milliseconds but may be set in a range from 1 to 40 milliseconds. That is, the pulse width may be set to be as short as possible in the range in which the contrast recovery effect can be obtained by the auxiliary pulse input but to be as long as possible in the range in which the overwriting does not occur.

Further, it is preferable that the auxiliary pulse is set to have the same cycle as the reference pulse and the second potential be shorter than the pulse width. It is preferable that the pulse width of the auxiliary pulse is in the range from 5 to 20 milliseconds. With such a range, it is possible to surely obtain the recovery effect of the contrast by the input of the auxiliary pulse and it is not likely to observe the overwriting.

With this embodiment, the pulse width of the low potential and the pulse width of the high potential are set to be the same (20 milliseconds) in the auxiliary pulse inputting step, but these may be differently set. For example, a period of the low potential L is set to 20 milliseconds and a period of the high potential H is set to 30 milliseconds. A period of a white display is 1.5 times a period of a black display. With this operation, it is possible to properly compensate the contrast decrease according to the difference of response characteristics of the pixels of a black display and the pixels of a white display.

Even when a period of the low potential L of the pulse and a period of the high potential H of the pulse are equal, if the number of pulses of the auxiliary pulse inputting step is set to be an odd number, it is possible to make the length of the low potential period different from the length of the high potential period. Accordingly, it is possible to obtain the above-described advantage. With this embodiment, since the pulse of the auxiliary pulse inputting step begins with a period of the high potential H and ends with a period of the high potential H, it is possible to set a period of a white display to be longer than a period of a black display.

In the driving method of the invention, it is preferable that a period of the short term interval step is set to be 200 or more seconds. When the interval is less than 200 milliseconds, since a voltage is applied to the electrodes in the state in which the reflectance does not nearly change from the reflectance of the image writing time, the same phenomenon as the overwriting occurs and the amount of the reflectance change is likely to be increased.

Accordingly, by setting the period of the short term interval step to be in the described range, the overwriting to the segments 40B and 40W does not occur and it is possible to suppress the reflectance decrease of a white display after the image writing, suppress the reflectance increase of a black display after the image writing, and realize a high contrast display.

In the driving method of the invention, it is preferable that a period of the short term interval step is shorter than 5 seconds. When the interval is longer than 5 seconds, the reflectance changes by a huge amount due to the kick back. Further, the reflectance change after the contrast maintaining step is visibly recognized by a user, and it is likely to impart unpleasantness to the user.

In the driving method of the invention, it is preferable that a period of the short term interval step is in the range from 500 milliseconds to 2 seconds. By setting the period of the short term interval set to be in the range, it is possible to prevent both the contrast lowering attributable to the overwriting when the short term interval is too short and the display flashing when the short term interval is too long.

Second Embodiment

With a second embodiment, a driving method of the segment-driving-type electrophoresis display device 1 shown in FIGS. 1 and 2 will be described. In the driving method according to the second embodiment, a contrast maintaining step is performed only once.

Figure 7:
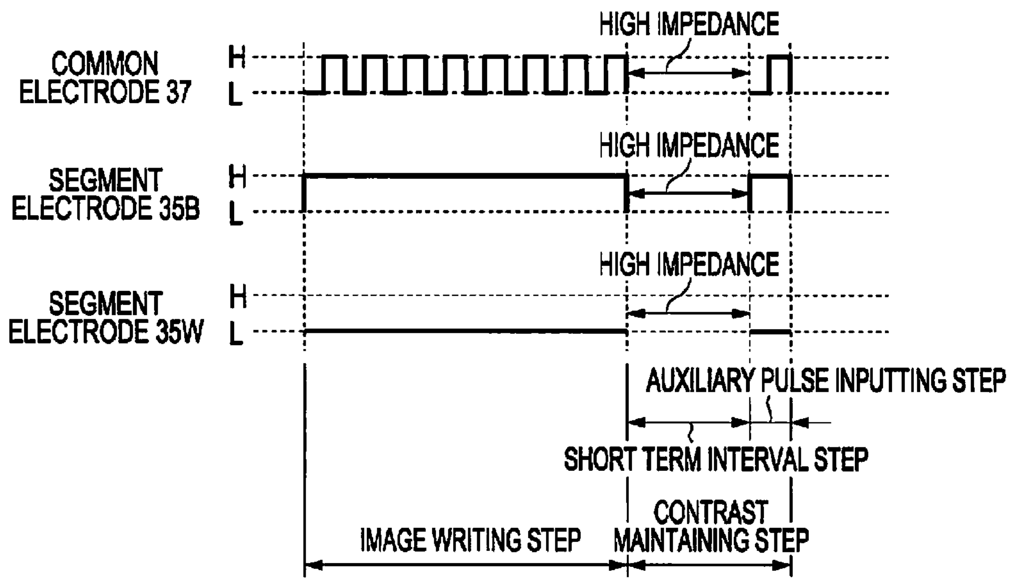
FIG. 7 is a timing chart according to a second driving method.

FIG. 7 shows a timing chart illustrating the driving method according to the second embodiment.

As shown in FIG. 7, the driving method according to the embodiment has an image writing step and a contrast maintaining step. After the contrast maintaining step is performed only one time, every electrodes fall into a high impedance state. The operations of the image writing and the contrast maintaining step are the same as the first embodiment.

By performing the driving method according to the second embodiment, it is possible to obtain the following advantages.

Since an auxiliary pulse inputting step is performed only one time, it is possible to decrease load applied to white particles 82 and black particles 83, it is possible to prevent overwriting to a segment 40B and a segment 40W.

Although the advantage of the driving method according to the second embodiment is somewhat weak in comparison with the driving method according to the first embodiment, it is also possible to improve contrast since the reflectance of a white display increases and the reflectance of a black display decreases.

Third Embodiment

With a third embodiment, a driving method of the segment-driving-type electrophoresis display device 1 shown in FIGS. 1 and 2 will be described. The driving method according to the third embodiment is a driving method in which a pulse cycle in an image writing step is shorter than a pulse cycle in an auxiliary pulse inputting step.

Figure 8:
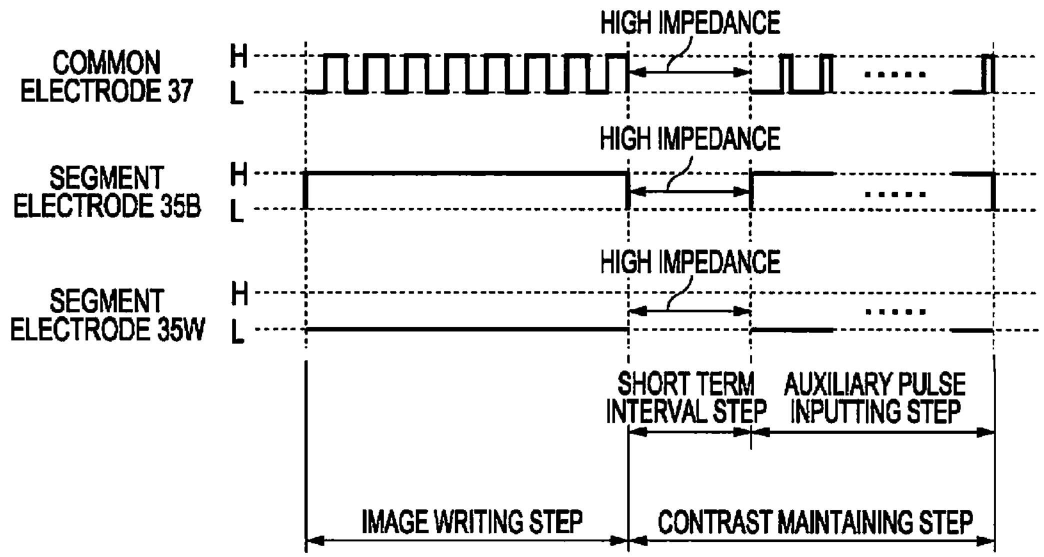
FIG. 8 is a timing chart according to a third driving method.

FIG. 8 shows a timing chart of the driving method according to the third embodiment.

As shown in FIG. 8, the driving method of this embodiment includes an image writing step and a contrast maintaining step. Details of the operation of the image writing step are the same as the first embodiment. During the contrast maintaining step, details of the operation of the short term interval is the same as the driving method according to the first embodiment.

Accordingly, a pulse width of an auxiliary pulse inputted to the common electrode 37 in the auxiliary pulse inputting step is set to be shorter than a pulse width of a reference pulse applied to the common electrode 37 in the image writing step. The auxiliary pulse is continuously inputted to the common electrode 37. The pulse width of the auxiliary pulse can be decreased to 5 milliseconds when the pulse width is 20 milliseconds in the image writing step. Further, as shown in FIG. 8, the pulse width means a period of a second potential (high potential H) in a single cycle of a common swing driving method and the cycle of the auxiliary pulse is the same as that of the reference pulse.

The pulse width of the auxiliary pulse can be changed in the range from 1 to 20 milliseconds according to the pulse width in the image writing step.

With this embodiment, a plurality of cycles of the auxiliary pulse is continuously inputted in the auxiliary pulse inputting step. The number of times of repetition (period of the auxiliary pulse inputting step) is not particularly limited but can be changed in a range by which the overwriting does not occur.

For example, it is preferable that the auxiliary pulse inputting step is continued between the current short term interval step a next image writing step (image update of a next frame). Alternatively, the auxiliary pulse may be shorter than 1 cycle. In such a case, only either a high potential H period or a low potential L period may be set.

In further alternative, the short term interval step may be set for every cycle of the auxiliary pulse inputting step like the first embodiment.

As for the cycle of the auxiliary pulse, it is not limited to be the same as the reference pulse, but may be different from that of the reference pulse as long as the pulse width of the auxiliary pulse is the above-described period. By this method, it is possible to obtain the above-described advantages.

By performing the driving method according to the third embodiment, the following advantages can be obtained.

In the auxiliary pulse inputting step, since the auxiliary pulse having a pulse width shorter than that of the pulse of the image writing step is applied to the common electrode 37, it is possible to perform an operation for recovering the reflectance by driving the electrophoresis element 32 with short steps. Accordingly, it is possible to decrease the load applied to the white particles 82 and the black particles 83, and it becomes easy to suppress the overwriting in the auxiliary pulse inputting step. Further, by continuing the auxiliary pulse inputting step until a next image writing step begins, it is possible to obtain a high contrast display.

Fourth Embodiment

With a fourth embodiment, a driving method of the segment-driving-type electrophoresis display device 1 shown in FIGS. 1 and 2 will be described. The driving method according to the fourth embodiment is a driving method in which a refresh step is performed after the auxiliary pulse inputting period.

Figure 9:
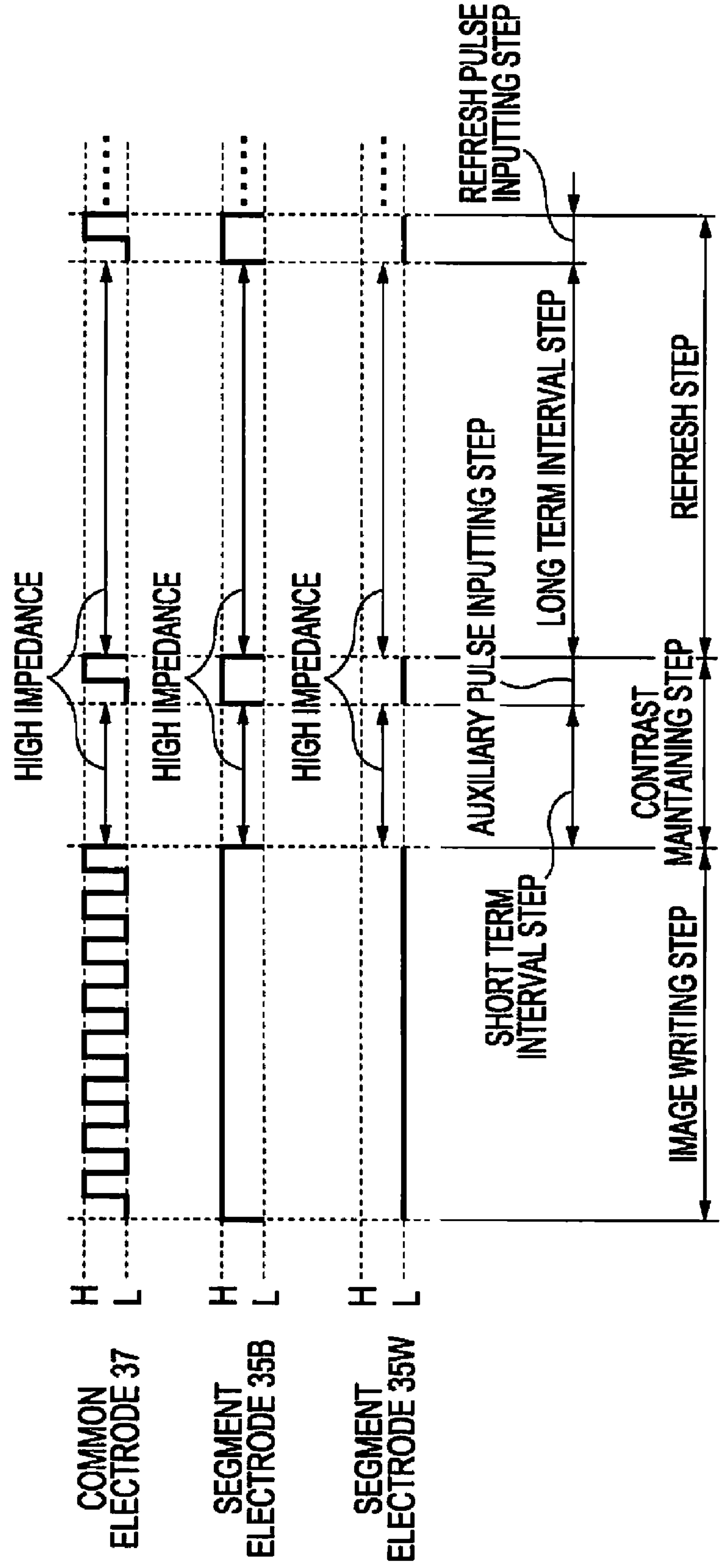
FIG. 9 is a timing chart according to a fourth driving method.

FIG. 9 shows a timing chart of the driving method according to the fourth embodiment.

As shown in FIG. 9, the driving method according to this embodiment includes an image writing step, a contrast maintaining step, and a refresh step. Details of the operations of the image writing step and the contrast step of these steps are the same as in the second embodiment, in the first embodiment, or in the third embodiment.

The refresh step includes a long term interval step and a refresh pulse inputting step, and is to suppress the contrast lowering during a relatively long period after the contrast maintaining step.

In the long term interval step, for 5 to 60 minutes after the contrast maintaining step, the segment electrode 35B, the segment electrode 35W, and the common electrode 37 are electrically isolated from one another and fall into a high impedance state.

In the refresh pulse inputting step, the segment electrode 35B is applied with the high potential H and the segment electrode 35W is applied with the low potential L. The common electrode 37 is applied with a refresh pulse in which a high potential H period and a low potential L period alternate. That is, the potentials of the segment electrode 35W and 35B and the common electrode 37 in the image writing step are applied to the corresponding electrodes.

Since the reflectance of a white display is increased and the reflectance of a black display is decreased, the refresh pulse applied to the common electrode 37 has the length of at least one cycle or longer. In the case in which the refresh pulse is shorter then one cycle, only a high potential H period or a low potential L period is set as the refresh pulse. However, in this case, it is possible to compensate the variation of the reflectance of at least one of the white display and the black display.

According to the driving method according to the fourth embodiment, since the refresh step is provided in the image maintaining period after the auxiliary pulse inputting step, it is possible to effectively prevent the contrast lowering even after the contrast maintaining step. Therefore, it is possible to maintain the contrast for a relatively long period.

Fifth Embodiment

With a fifth embodiment, a driving method of the segment-driving-type electrophoresis display device 1 shown in FIGS. 1 and 2 will be described. The driving method according to the fifth embodiment is a driving method in which a period of a short term interval step is decreased by repeating a contrast maintaining step a plurality of times.

Figure 10:
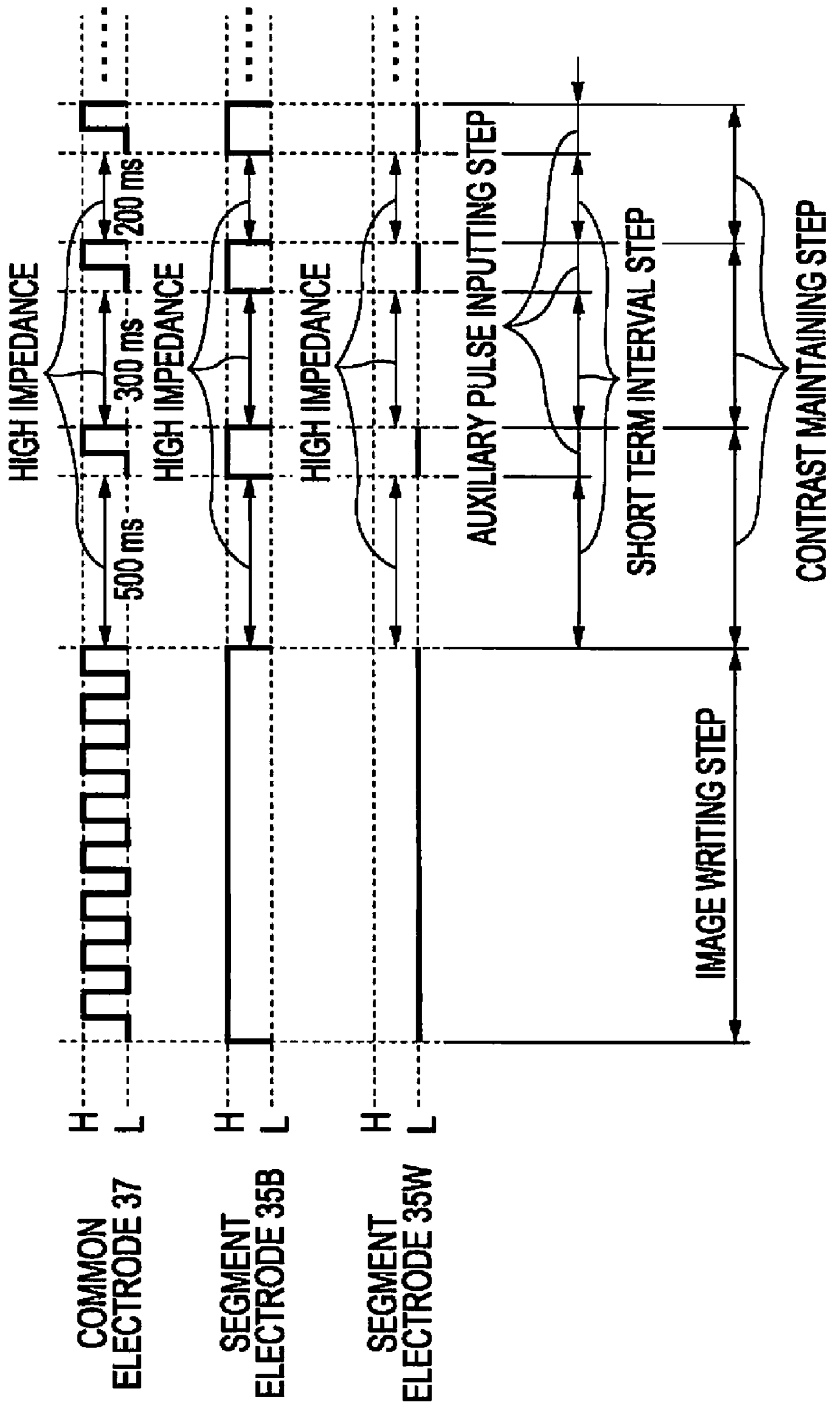
FIG. 10 is a timing chart according to a fifth driving method.

FIG. 10 shows a timing chart of the driving method according to the fifth embodiment.

As shown in FIG. 10, the driving method according to this embodiment includes an image writing step and a plurality of contrast maintaining steps. The operation of the image writing step is the same as the driving method according to the first embodiment.

In the driving method of this embodiment, the contrast maintaining step is performed a plurality of times, but a period of the short term interval step is changed every when the contrast maintaining step is performed. For example, the period of the first short term interval step is 800 milliseconds, the period of the second short term interval step is 500 milliseconds, and the period of the third short term interval step is 300 milliseconds. The period of each short term interval step is not limited in detail, but may be changed according to the display characteristic of the electrophoresis display device. As described in the first embodiment, since the contrast lowering attributable to the overwriting is prevented, the period of the short term interval step is set to be 200 milliseconds or longer. The operations (pulse width, period, and number of times of repetition) of the auxiliary pulse inputting step may be different according to the kinds of the previous embodiment. In this embodiment, the operations of the auxiliary pulse inputting steps in the plurality of times of the contrast maintaining step are the same.

By performing the driving method according to the fifth embodiment, the following advantage can be obtained.

As shown in FIGS. 6A and 6B, if the plurality of times of contrast maintaining steps is repeatedly performed, since the reflectance of a white display is increased to be closer to the reflectance at the time of the image writing and the fluctuation of the reflectance becomes decreased. Further, the reflectance of a black display changes in the same manner as the reflectance of a white display.

In this embodiment, since a period of the short term interval step becomes shorter every when the contrast maintaining step is performed, the reflectance becomes rapidly closer to the reflectance at the time of the image writing. With this embodiment, it is possible to reduce the time needed to recover the initial contrast in comparison with the case in which the short time interval steps having the same period are performed, and thus it is possible to reduce power consumption of the electrophoresis display device.

Sixth Embodiment

In a sixth embodiment of the invention, a driving method of the segment-driving-type electrophoresis display device 1 shown in FIGS. 1 and 2 will be described. According to the driving method according to the sixth embodiment, the common electrode 37 is electrically disconnected in the short term interval step of the contrast maintaining step and the segment electrodes 35B and 35W are applied with the potential applied in the image writing step.

Figure 11:
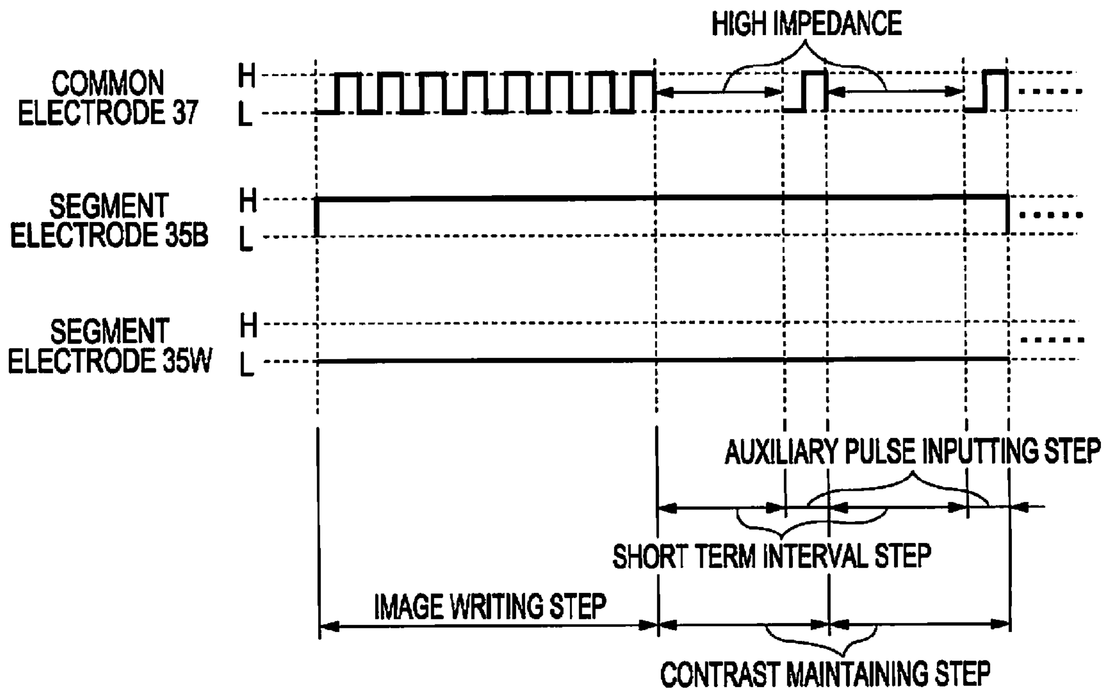
FIG. 11 is a timing chart according to a sixth driving method.

FIG. 11 shows a timing chart according to the sixth embodiment.

As shown in FIG. 11, the driving method of the sixth embodiment includes an image writing step and a plurality of contrast maintaining steps. Since the image writing step is the same as in the first driving method, description thereof will be omitted.

The contrast maintaining step includes a short term interval step and an auxiliary pulse inputting step. In the short term interval step, the common electrode 37 is electrically disconnected, and the segment electrodes 35W and 35B are applied with potentials which are equivalent to the potentials applied in the image writing step. That is, the segment electrode 35B is applied with the high potential H and the segment electrode 35W is applied with the low potential L.

Since the auxiliary pulse inputting step according to the sixth embodiment is the same as in any of the driving methods according to first to fifth embodiments, description thereof will be omitted.

By performing the driving method according to the sixth embodiment, it is possible to maintain a high contrast image after the image writing like the above-described embodiments and the following advantages can be obtained.

In the short term interval step, since the potentials applied to the segment electrodes 35B and 35W in the image writing step are maintained, even after the auxiliary pulse inputting step begins, reapplication of the potentials to the segment electrodes 35B and 35W is not needed, and thus it is possible to suppress the load of the voltage control circuit 60.

The above embodiments are described with an example of the segment-driving type electrophoresis display device but may not be limited thereto. For example, the embodiments can be applied to an active matrix-driving type electrophoresis display device shown in FIG. 12. In even such a case, the same advantages as the above-described embodiments can be obtained.

Seventh Embodiment

A driving method according to a seventh embodiment of the invention will be described with reference to an active matrix-driving type electrophoresis display device.

Structure of Electrophoresis Display Device

Figure 12:
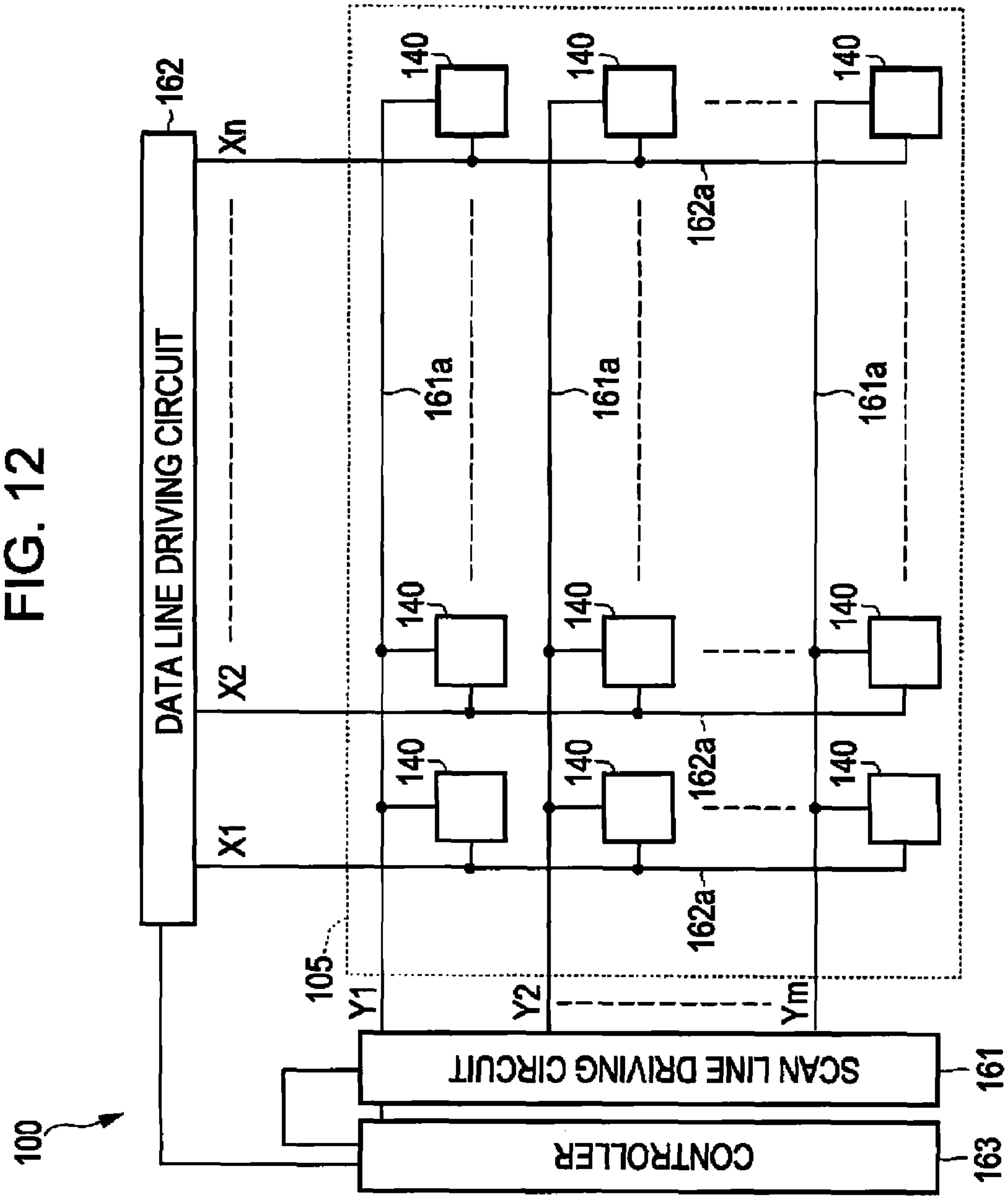
FIG. 12 is a schematic plan view illustrating an electrophoresis display device 100.

FIG. 12 shows an active matrix-driving type electrophoresis driving method 100. The electrophoresis display device 100 includes a displaying portion 105 in which a plurality of pixels 140 is arranged in a matrix form, a scan line driving circuit 161 and a data line driving circuit 162 arranged to surround the displaying portion 105, and a controller 163. A plurality of scan lines 161*a* extend from the scan line driving circuit 161 toward the displaying portion 105 and a plurality of data lines 162*a* extend from the data line driving circuit 162 toward the displaying portion 105. The scan line driving circuit 161 and the data line driving circuit 162 are connected to the controller 163 which is a control portion of the electrophoresis display device 100.

The scan line driving circuit 161 and the pixels 140 are connected to one another via the plurality of scan lines 161*a* (Y1, Y2, . . . , and Ym) extending in an extending direction of the data line driving circuit 162. The data line driving circuit 162 and the pixels 140 are connected to one another via a plurality of data lines 162*a* (X1, X2, . . . , and Xn) extending in an extending direction of the scan line driving circuit 161.

Figure 13:
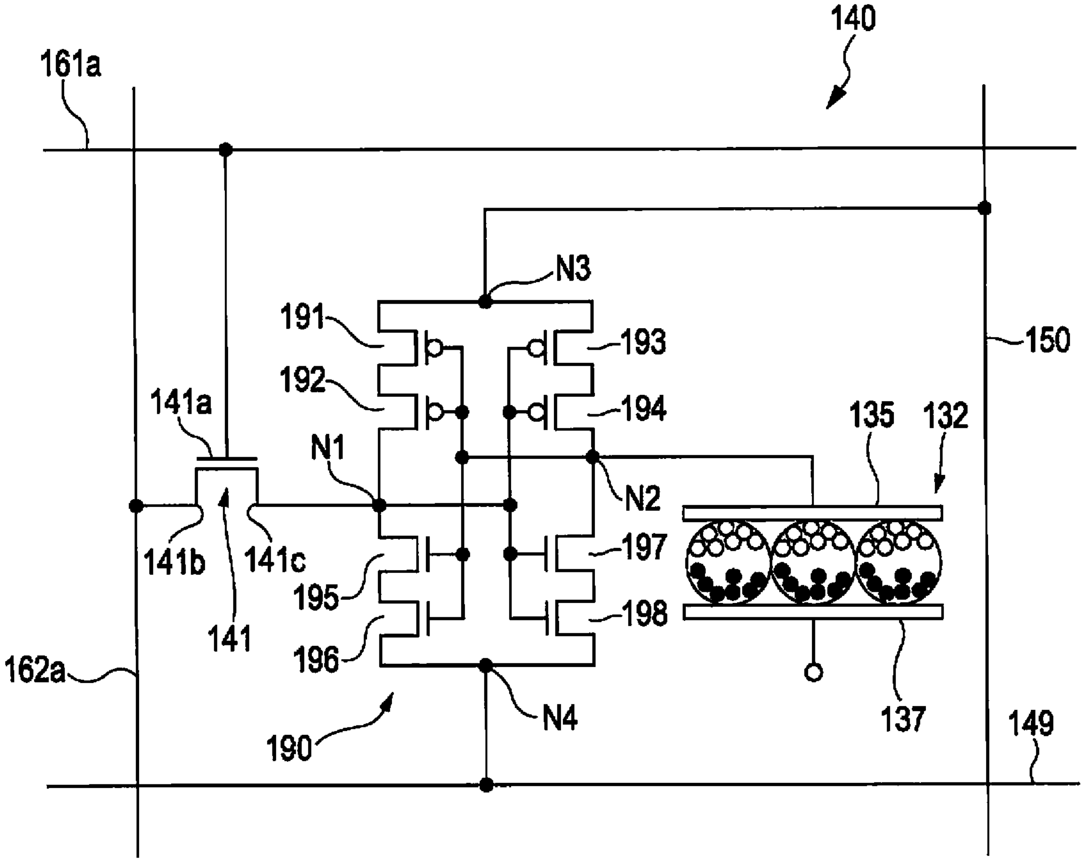
FIG. 13 is a circuitry diagram illustrating a pixel 140.

FIG. 13 is a circuitry diagram showing the pixel 140. As shown in FIG. 13, the pixel 140 includes a switching element (pixel circuit) 141, a latch circuit (memory circuit) 190 consisting of eight transistors, and an electrophoresis element 132. The electrophoresis element 132 is interposed between the pixel electrode 135 and the common electrode 137.

The common electrode 137 is a common electrode shared by all the pixels 140. In the electrophoresis display device 100, the common electrode 137 side is a displaying surface.

The switching element 141 is a field effect type n-channel transistor. A gate 141*a* of the switching element 141 is connected to the scan line 161*a*, an input terminal 141*b* of the switching element is connected to the data line 162*a*, and an output terminal 141*c* of the switching element is connected to the latch circuit 190.

The latch circuit 190 includes an inverter circuit consisting of p-channel transistors 191 and 192 connected in parallel with one another and n-channel transistors 195 and 196 connected in parallel with one another and an inverter circuit consisting of p-channel transistors 193 and 194 connected in parallel with one another and n-channel transistors 197 and 198 connected in parallel with one another.

The latch circuit 190 has an input terminal N1 and an output terminal N2. At the input terminal N1, the p-channel transistor 192 and the n-channel transistor 195 are connected to one another, and at the output terminal N2, the p-channel transistor 194 and the n-channel transistor 197 are connected to one another.

Gates of the p-channel transistors 191 and 192 and the n-channel transistors 195 and 196 are connected to the output terminal N2 and the pixel electrode 135, and gates of the p-channel transistors 193 and 194 and the n-channel transistors 197 and 198 are connected to the input terminal N1 and the switching element 141.

The p-channel transistors 191 and 193 are connected to the high potential power source line 150, and the n-channel transistors 196 and 198 are connected to the low potential power source line 149.

The latch circuit 190 having such a structure is a static random access memory (SRAM). When a high potential is inputted into the input terminal N1 as image data, a low potential appears at the output terminal N2. When the low potential is inputted into the input terminal N1 as the image data, the high potential appears at the output terminal N2. Further, the image data inputted into the latch circuit 190 is maintained until the latch circuit 190 turns off. Accordingly, a stable potential is applied to the pixel electrode 135.

In the latch circuit 190, arranging two transistors such as the p-channel transistors 191 and 192 to be in parallel with one another (double gate) is to decrease the leak current. With such a structure, it is possible to reduce consumption of power. Alternatively, instead of the double gate (i.e. arranging two transistors), a single gate structure (i.e. arranging transistors one by one) may be employed. In the case of the single gate structure, since the structure is simple, it is possible to enhance yield of pixel circuits and suppress the increase of manufacturing cost. The single gate structure can be also applied to the structure of the latch circuit and the transmission gate of FIG. 15.

Driving Method of Electrophoresis Display Device

A driving method according to a seventh embodiment is a driving method associated with the active matrix driving type electrophoresis display device 100. The driving method according to the seventh embodiment is a driving method which maintains image data by driving a latch circuit 190 at the minimum level by lowering a potential of a high potential power source line 150 in the short interval step of the contrast maintaining step.

Figure 14:
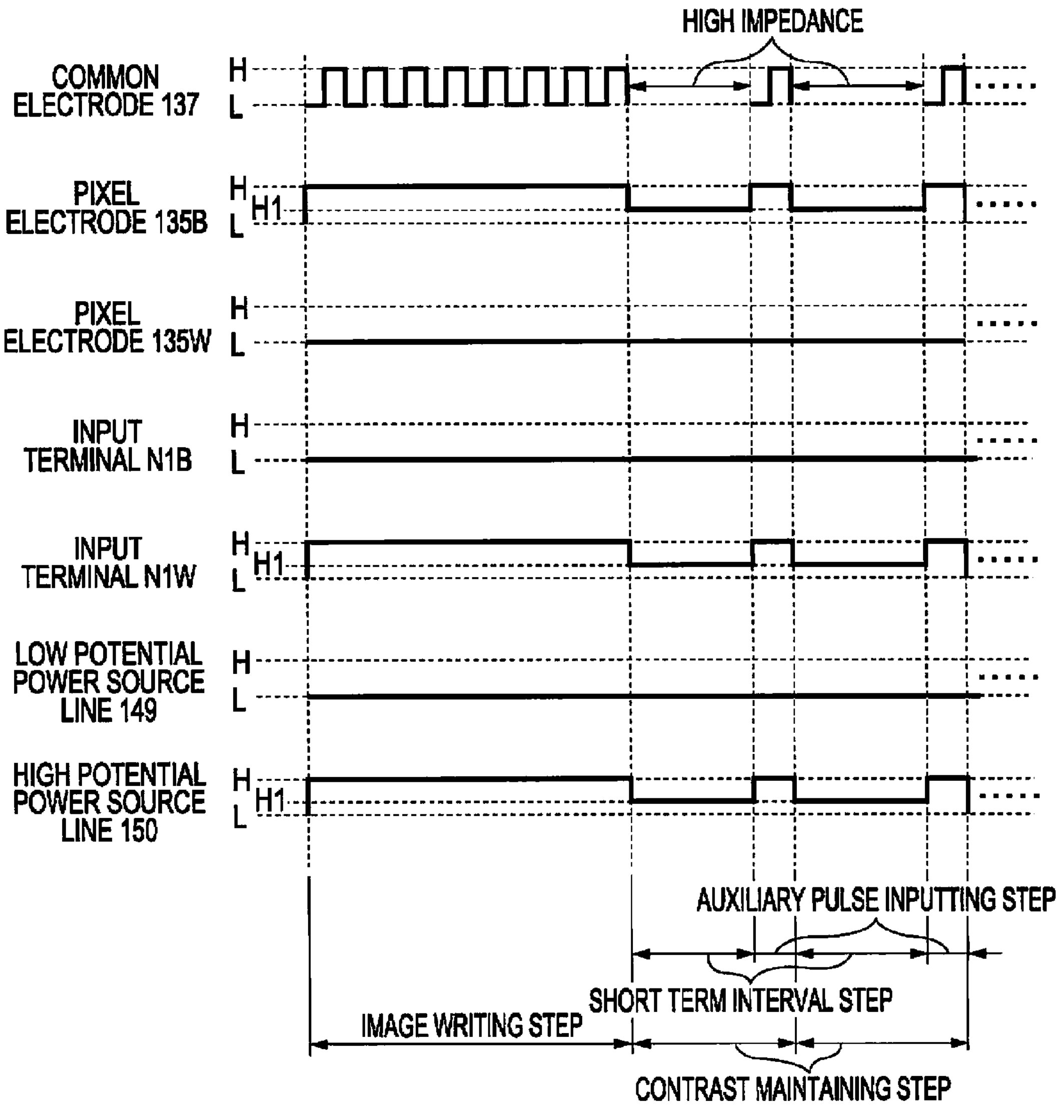
FIG. 14 is a timing chart according to a seventh driving method.

FIG. 14 is a timing chart illustrating the driving method according to the seventh embodiment. As shown in FIG. 14, the driving method according to this embodiment includes an image writing step and a contrast maintaining step.

In the following description, a pixel 140 will be described with reference to a pixel 140 performing a black display and a pixel 140 performing a white display, separately.

In FIG. 14, potentials applied to a common electrode 137, a low potential power source line 149, a high potential power source line 150, a pixel electrode 135B of the pixel 140 performing a black display, an input terminal N1B, a pixel electrode 135W of the pixel 140 performing a white display, and an input terminal N1W are shown.

In the image writing step, when a low potential L is applied to the input terminal N1B as image data, the pixel electrode 135B is applied with the high potential H. When the high potential H is applied to the input terminal N1W as the image data, the pixel electrode 135W is applied with the low potential L. The common electrode 137 is applied with the same potential as the potential applied to the common electrode 35 in the first embodiment and the image is written.

The contrast maintaining step includes a short term interval step and an auxiliary pulse inputting step. In the short term interval step, the common electrode 137 is electrically disconnected, and comes to fall into a high impedance state.

The potential of the high potential power source line 150 can be lowered to the minimum potential H1 which can drive the latch circuit 190, and to 1V, for example.

The minimum potential H1 which can drive the latch circuit 190 means a potential which can maintain the memory of the latch circuit. With this embodiment, the minimum potential H1 is set to 1V, but may be set to be a different voltage, taking the characteristic of the latch circuit into consideration.

With such a structure, it is possible to maintain the image data in the latch circuit 190 in the short term interval step. At this time, the potential H1 is applied to the pixel electrode 135B and the low potential L is applied to the pixel electrode 135W.

When the potential L of the low potential power source line 149 is set to be higher than the potential H1, the potential of the low potential power source line 149 is lowered to a level lower than the potential H1 so that the inversion of the image data is prevented.

In the auxiliary pulse inputting step, the potential of the high potential power source line 150 recovers to the high potential H, and the pixel electrode 135B is applied with the high potential H.

The common electrode 137 is applied with the auxiliary pulse which is the same as in any one of the first to the sixth driving methods.

The period of the contrast maintaining step and the number of times of repetition can be set in the same manner as in the above-described embodiments. The short term interval step and the auxiliary pulse inputting step are also set in the same manner as in the above-described embodiments.

By performing the driving method according to the seventh embodiment, as in the same manner as the above-described embodiments, it is possible to maintain the high contrast of an image after the image writing and the following advantages can be obtained.

The latch circuit 190 is driven at a low potential in the short term interval step and the image data inputted into the latch circuit 190 in the image writing step can be maintained. Accordingly, in the auxiliary pulse inputting step, it is satisfactory that the mage data is not inputted again to the pixel electrodes 135B and 135W. Therefore, it is possible to suppress the load of the controller 163. Further, since the potential of the high potential power source line 150 is lowered, it is possible to suppress the power consumption to a low level.

Eighth Embodiment

Structure of Electrophoresis Display Device

Next, an active matrix driving type electrophoresis display device 100 equipped with a pixel 240 having a switching circuit will be described.

Figure 15:
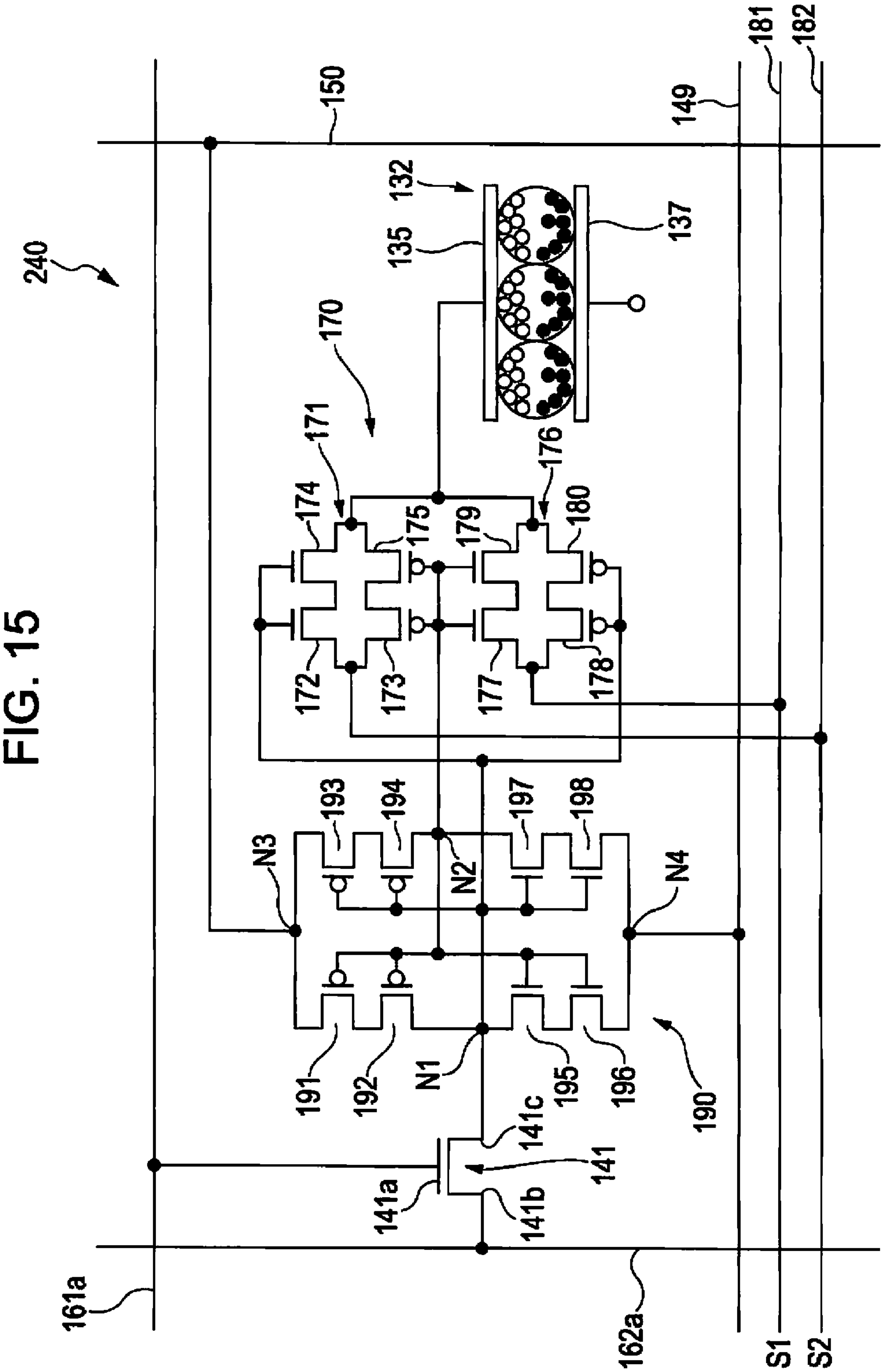
FIG. 15 is a circuitry diagram illustrating a pixel 240.

FIG. 15 is a circuitry diagram showing the pixel 240 having a switching circuit 170. The switching circuit 170 is disposed between a latch circuit 190 and a pixel electrode 135. The latch circuit 190 is the same as in the seventh embodiment.

The switching circuit 170 includes two transmission gates 171 and 176. The transmission gate 171 consists of n-channel transistors 172 and 174 connected in parallel with one another and p-channel transistors 173 and 175 connected in parallel with one another. An input terminal of the transmission gate 171 is connected to a second control line 182.

The transmission gate 176 consists of n-channel transistors 177 and 179 connected in parallel with one another and p-channel transistors 178 and 180 connected in parallel with one another. An input terminal of the transmission gate 176 is connected to a first control line 181.

Gates of the n-channel transistors 172 and 174 and the p-channel transistors 178 and 180 are connected to an input terminal N1 of the latch circuit 190. On the other hand, gates of the p-channel transistors 173 and 175 and the n-channel transistors 177 and 179 are connected to an output terminal N2 of the latch circuit 190.

Output terminals of the transmission gates 171 and 176 are connected to the pixel electrode 135.

The switching circuit 170 is structured in a manner such that the transmission gate 171 or the transmission gate 176 is driven on the basis of the image data inputted into the latch circuit 190. With such a structure, when the transmission gate 171 is driven, the potential of the second control line 182 is inputted into the pixel electrode 135, and when the transmission gate 176 is driven, the potential of the first control line 181 is inputted into the pixel electrode 135.

Driving Method of Electrophoresis Display Device

A driving method according to an eighth embodiment of the invention is a driving method according to a pixel 240 including a switch circuit 170. The eighth driving method is a driving method of electrically disconnecting a first control line 181 from a second control line 182 by lowering a potential of a latch circuit 190 to the minimum level in a short term interval step of a contrast maintaining step.

Figure 16:
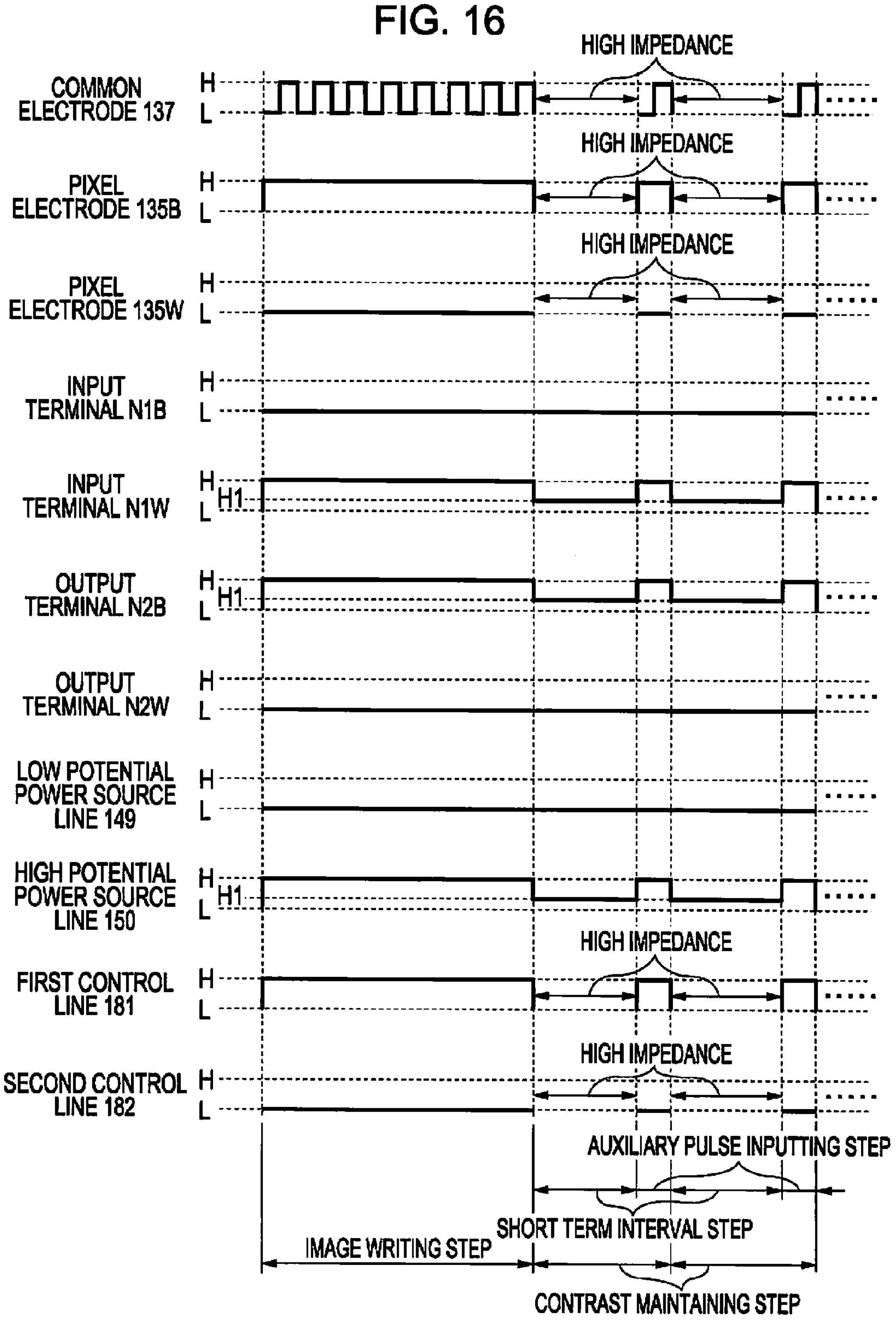
FIG. 16 is a timing chart according to an eighth driving method.

FIG. 16 is a timing chart showing the driving method according to the eighth embodiment of the invention. In the following description, as for the pixel 240, a pixel 240B performing a black display and a pixel 240W performing a white display will be separately described. FIG. 16 shows a common electrode 137, a low potential power source line 149, a high potential power source line 150, a first control line 181, a second control line 182, a pixel electrode 135B of the pixel 140B performing a black display, an input terminal N1B of a latch circuit 190B, an output terminal N2B of the latch circuit 190B, a pixel electrode 135W of the pixel 140W performing a white display, an input terminal N1W of a latch circuit 190W, and an output terminal N2W of the latch circuit 190W. As shown in FIG. 16, the driving method according to this embodiment has an image writing step and a contrast maintaining step.

In the image writing step, if the low potential L is applied to the input terminal N1B as image data, the output terminal N2B becomes a high potential H, and a transmission gate 176 is driven. When the transmission gate 176 is open, the potential of the first control line 181 is applied to the pixel electrode 135B.

Here, since the first control line 181 becomes the high potential H, the pixel electrode 135B is applied with the high potential H.

On the other hand, when the input terminal N1W is applied with the high potential H as the image data, the output terminal N2W becomes the low potential L and the transmission gate 171 is driven. When the transmission gate 171 turns on, the potential of the second control line 182 is applied to the pixel electrode 135W.

Here, since the second control line 182 becomes the low potential L, the pixel electrode 135W is applied with the low potential L.

In the first embodiment, the common electrode 137 is applied with a pulse which is the same as the reference pulse applied to the common electrode 35.

In the contrast maintaining step, the short term interval step and the auxiliary pulse inputting step are performed.

In the short term interval step, the common electrode 137 is electrically disconnected and falls into a high impedance state. The potential of the high potential power source line 150 is lowered to the minimum level H1 as low as possible to a level at which the latch circuit 190 can be driven like the seventh driving method and thus the operation of the latch circuit 190 is continued. The first control line 181 and the second control line 182 are electrically disconnected from one another, and fall into a high impedance state.

At this time, the image data is held in the latch circuit 190, and the transmission gate 171 or the transmission gate 176 is driven. However, since the first control line 181 and the second control line 182 are electrically disconnected from one another the pixel electrodes 135B and 135W fall into a high impedance state.

In the auxiliary pulse inputting step, the potential of the high potential power source line 150 recovers to the high potential H. Further, potentials of the first control line 181 and the second control line 182 recover to the potential in the image writing step. In greater detail, the first control line 181 is applied with the high potential H and the second control line 182 is applied with the low potential L.

The common electrode line 137 is applied with the auxiliary pulse which is the same as in any one of the first to sixth embodiments.

The period of the contrast maintaining step and the number of times of repetition can be set in the same manner as any of the embodiments. The short term interval step and the auxiliary pulse inputting step are also set in the same manner as any of the embodiments.

According to the driving method of the eighth embodiment, like the above-described embodiments, it is possible to maintain the high contrast image after the image writing and to obtain the following advantages.

With the presence of the latch circuit 170, potentials applied to the pixel electrodes 135B and 135W can be controlled by the first control line 181 and the second control line 182. Accordingly, in the short term interval step, it is possible to disconnect the pixel electrodes 135B and 135W in the state in which the image data is held in the latch circuit 190.

Moreover, since the latch circuit 190 can be driven at the optimum potential, it is possible to maintain the image data, suppressing the power consumption in the short term interval step.

Electronic Apparatus

Figure 17:
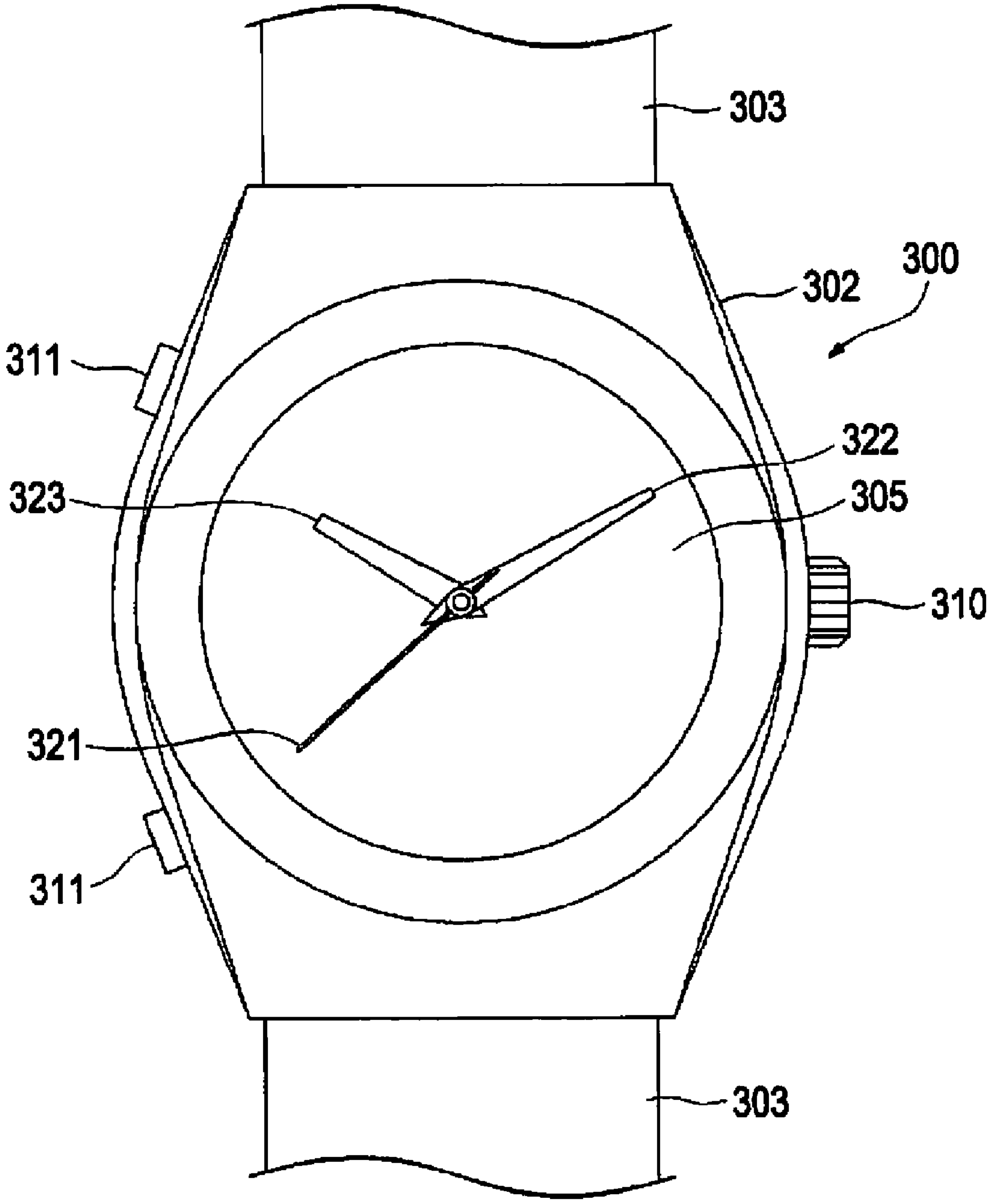
FIG. 17 is a front view illustrating a watch 300.

Hereinafter, the case in which the electrophoresis display device is applied to an electronic apparatus will be described. FIG. 17 shows a write watch 300.

The wristwatch 300 consists of a clock casing 302, and a pair of hands 303 connected to the watch casing 302.

On the front face of the watch casing 302, the electrophoresis display device (display panel) 305, a second hand 321, a minute hand 322, and an hour hand 323 are disposed. On the side face of the watch casing 302, a winding crown 310 and a manipulation button 311 are disposed as manipulators. The winding crown 310 is connected to a winding stem (not shown) disposed in a casing, is integrally formed with the winding stem. The winding crown can be freely pushed or pulled in a multiple stages (for example, 2 state), and is freely rotated.

In the electrophoresis display device 305, an image of a background, character strings such as data and time, or hands of a clock, such as a hour hand, a minute hand, and a second hand can be displayed.

With the use of the electrophoresis display device according to the invention, it is possible to realize a watch 300 equipped with a displaying portion which is capable of suppressing reflectance decrease of a white display right after image writing and suppressing reflectance increase right after a black display right after image writing, and which thus has high contrast.

Figure 18:
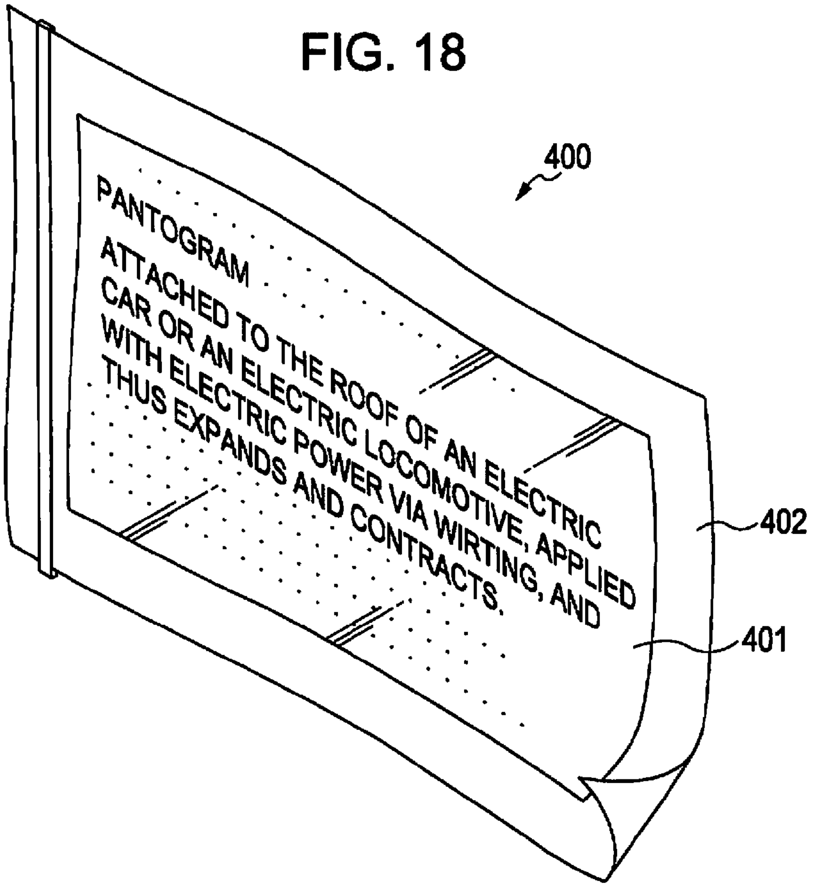
FIG. 18 is a perspective view illustrating electronic paper 400.

Next, electronic paper 400 and an electronic notebook will be described. FIG. 18 shows the structure of the electronic paper 400. The electronic paper 400 employs the electrophoresis display device according to the invention as a displaying portion 401. the electronic paper 400 is constituted as a main body 402 formed of a rewritable sheet having flexibility and paper-like texture and softness.

Figure 19:
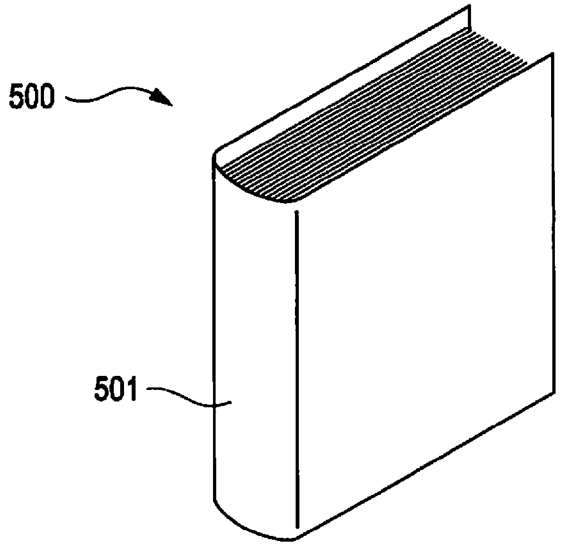
FIG. 19 is a perspective view illustrating an electronic notebook 500.

FIG. 19 shows the structure of an electronic notebook 500. The electronic notebook 500 has a structure in which a plurality of pieces of the electronic paper 400 shown in FIG. 18 is filed between covers 501. The cover 501 is equipped with a display data input unit (not shown) for allowing display data sent from external devices to be inputted. With this structure, it is possible to change and update the display contents in the sate in which the plurality of pieces of electronic paper 400 is filed, according to the display data.

By applying the electrophoresis display device according to the invention to electronic paper 400 or an electronic notebook 500, it is possible to suppress reflectance decrease of the white display right after the image writing, suppress reflectance increase of the black display right after the image writing, and thus to realize the electronic paper 400 or the electronic notebook 500 having a displaying portion having high contrast.

Besides the above, the electrophoresis display device according to the invention can be employed as a displaying portion of an electronic apparatus, such as a cellular phone and a portable video player.

Accordingly, it is possible to suppress the reflectance decrease of the white display right after the image writing, to suppress the reflectance increase of the black display right after the image writing, and thus to realize an electronic apparatus having a displaying portion having high contrast.

The entire disclosure of Japanese Patent Application No. 2007-237637, filed Sep. 13, 2007 is expressly incorporated by reference herein.

What is claimed is:

1. A method of driving an electrophoresis display device having a displaying portion which includes an electrophoresis element containing electrophoresis particles and disposed between a first electrode and a second electrode opposing to one another and which consists of a plurality of pixels, comprising:

after performing an image writing step in which an image is written into the displaying portion by applying a first potential or a second potential to the first electrode separately provided for the pixel and applying a reference pulse in which the first potential and the second potential repeatedly alternate at a predetermined interval to the second electrode which is a common electrode shared by all the pixels, performing at least one contrast maintaining step including a short term interval step in which the second electrode and all the first electrodes fall in a high impedance state for five or less seconds and an auxiliary pulse inputting step in which at least one cycle of the reference pulse is applied to the second electrode and a potential which is equivalent to the potential applied during the image writing step is applied to the first electrode while the reference pulse is applied.

2. The method of driving an electrophoresis device according to claim 1, wherein the contrast maintaining step is performed a plurality of times.

3. The method of driving an electrophoresis device according to claim 2, wherein a period of the short interval step is changed for every contrast maintaining step.

4. The method of driving an electrophoresis device according to claim 1, wherein the contrast maintaining step is continued until a next image writing step begins.

5. The method of driving an electrophoresis device according to claim 1, wherein the first electrode is applied with a potential which is equivalent to the potential applied during the image writing step and the second electrode comes to fall in a high impedance state in the short term interval step.

6. The method of driving an electrophoresis device according to claim 1, wherein after the contrast maintaining step, a control portion performs a refresh step including:

a long term interval step in which the first electrodes and the second electrode fall in a high impedance state for 5 to 60 minutes, and a refresh pulse input step in which a pulse which generates a potential difference between the first electrode and the second electrode, the potential difference being equivalent to that caused in the image writing operation, is applied to the first electrode.

7. An electrophoresis device having a displaying portion which includes an electrophoresis element containing electrophoresis particles and disposed between a first electrode and a second electrode opposing to one another and which consists of a plurality of pixels, wherein a control portion performs at least one contrast maintaining operation including:

a short term interval operation in which the second electrode and all the first electrodes fall in a high impedance state for five or less seconds; and an auxiliary pulse inputting operation in which at least one cycle of a reference pulse is applied to the second electrode and a potential which is equivalent to the potential applied during the image writing step is applied to the first electrode while the reference pulse is applied, after performing an image writing operation in which an image is written into the displaying portion by applying a first potential or a second potential to the first electrode separately provided for the pixel and applying the reference pulse in which the first potential and the second potential repeatedly alternate at a predetermined interval to the second electrode which is a common electrode shared by all the pixels.

8. The electrophoresis device according to claim 7, wherein the control portion performs a contrast maintaining operations a plurality of times.

9. The electrophoresis device according to claim 8, wherein a period of the short term interval operations is changed for every contrast maintaining operation.

10. The electrophoresis device according to claim 7, wherein the control portion makes the contrast maintaining operation continue until a next image writing operation begins.

11. The electrophoresis device according to claim 7, wherein the short term interval operation is an operation for applying a potential which is equivalent to the potential applied during the image writing operation to the first electrode and making the second electrode be in a high impedance state.

12. The electrophoresis device according to claim 7, wherein, after the contrast maintaining operation, the control portion performs a refresh operation including:

a long term interval operation in which the first electrodes and the second electrode fall in a high impedance state for 5 to 60 minutes, and a refresh pulse inputting operation in which a pulse which causes a potential difference between the first electrode and the second electrode, the difference being equivalent to that caused in the image writing operation is applied to the first electrode.

13. The electrophoresis device according to claim 7, wherein the pixel and the control portion are connected to one another via a pixel circuit disposed to correspond to the pixel, respectively and the pixel circuit includes a memory portion.

14. An electronic apparatus comprising the electrophoresis device according to claim 7.

* * * * *